(12) United States Patent  (10) Patent No.: US 7,394,892 B2
Sato et al.  (45) Date of Patent: Jul. 1, 2008

(54) CONTENT REPRODUCTION DEVICE

(75) Inventors: Katsuhiro Sato, Aichi (JP); Toru Kamimura, Shiga (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 511 days.

(21) Appl. No.: 10/535,193

(22) PCT Filed: Nov. 12, 2003

(86) PCT No.: PCT/JP03/14408

§ 371 (c)(1),
(2), (4) Date: May 18, 2005

(87) PCT Pub. No.: WO2004/047410

PCT Pub. Date: Jun. 3, 2004

(65) Prior Publication Data

US 2006/0067491 A1  Mar. 30, 2006

(30) Foreign Application Priority Data

Nov. 19, 2002  (JP) ............................. 2002-334502

(51) Int. Cl.
*H04M 11/00* (2006.01)
(52) U.S. Cl. .............................. 379/101.01; 379/93.09; 379/90.01
(58) Field of Classification Search ............ 379/101.01, 379/90.01, 93.09, 93.11
See application file for complete search history.

(56) References Cited

U.S. PATENT DOCUMENTS 6,154,647 A * 11/2000 Dahlin et al. ............ 455/426.1

| | | | |
|---|---|---|---|
| 6,662,022 B1 * | 12/2003 | Kanamori et al. ......... 455/556.1 |
| 6,954,652 B1 * | 10/2005 | Sakanashi ................ 455/550.1 |
| 7,272,232 B1 * | 9/2007 | Donaldson et al. ........ 455/556.1 |
| 2002/0072326 A1 * | 6/2002 | Qureshey et al. .......... 455/3.02 |
| 2004/0204159 A1 * | 10/2004 | Van Bosch ................ 455/569.1 |
| 2005/0049002 A1 * | 3/2005 | White et al. .............. 455/556.1 |
| 2006/0114890 A1 * | 6/2006 | Martin Boys ............... 370/352 |

FOREIGN PATENT DOCUMENTS

| | | |
|---|---|---|
| JP | 63-253754 | 10/1988 |
| JP | 63-253757 | 10/1988 |
| JP | 02-87759 | 3/1990 |
| JP | 2-87759 | 3/1990 |
| JP | 2002-223279 | 8/2002 |

* cited by examiner

*Primary Examiner*—Stella L Woo
(74) *Attorney, Agent, or Firm*—Kratz, Quintos & Hanson, LLP

(57) ABSTRACT

A contents reproducing apparatus includes a main CPU, and in a radio mode, the main CPU causes a DSP to decode broadcast data included in a radio packet signal input via a LAN controller, and decoded PCM data is input to a D/A conversion circuit. Consequently, a sound of Internet radio broadcasting is output from a speaker. Then, when there is a telephone call, the main CPU switches to a telephone mode. That is, receiving speech data included in a telephone packet signal input via the LAN controller is decoded by the DSP, and decoded PCM data is input to a PCM codec. Consequently, a receiving speech sound is output from a speaker of a receiver. It is noted that in a case that a radio program during reception is a pay program, the main CPU does not switch to the telephone mode.

7 Claims, 12 Drawing Sheets

50

70 — INCOMING OF TELEPHONE
72 — OCTOBER 28, 2002, 15:35
74 — OPPONENT PARTY : x x — x x x x — x x x x

50

80 — PRESENCE OF INCOMING/MESSAGE
82 — OCTOBER 28, 2002, 15:35
84 — OPPONENT PARTY: xx — xxxx — xxxx

50

90 — PRESENCE OF INCOMING
92 — OCTOBER 28, 2002, 15:35
94 — OPPONENT PARTY: xx — xxxx — xxxx

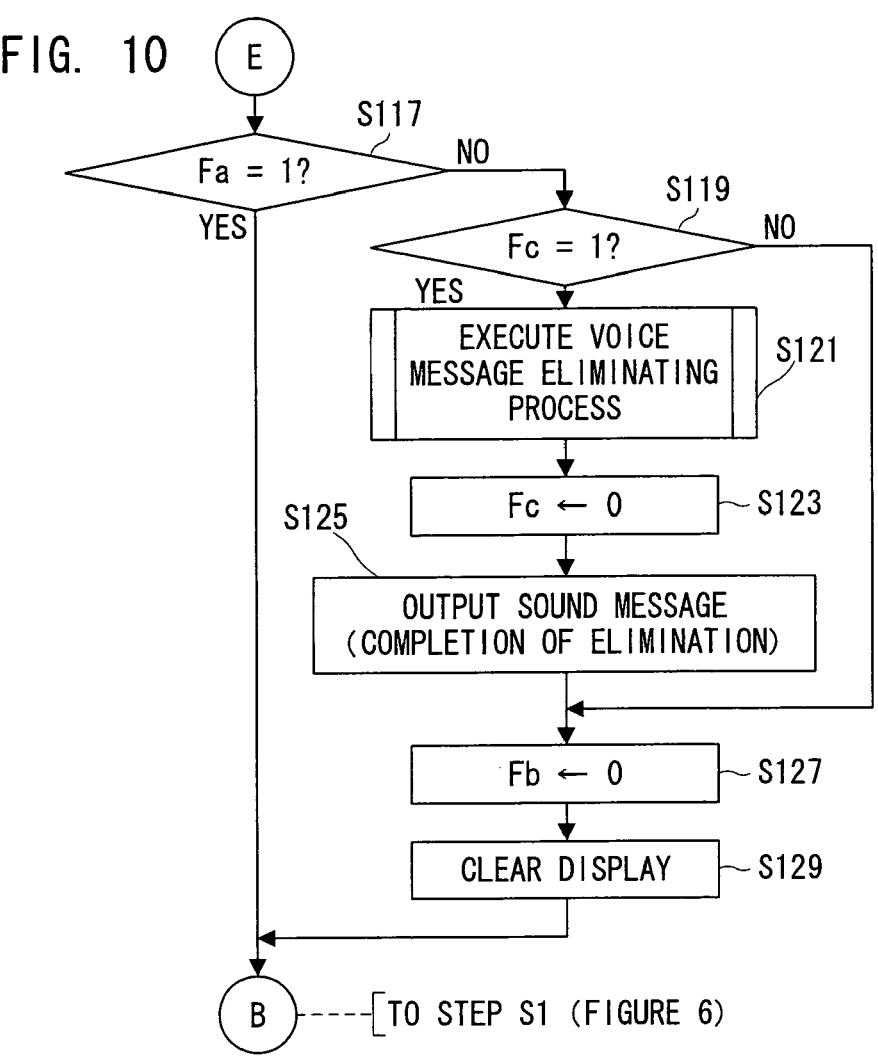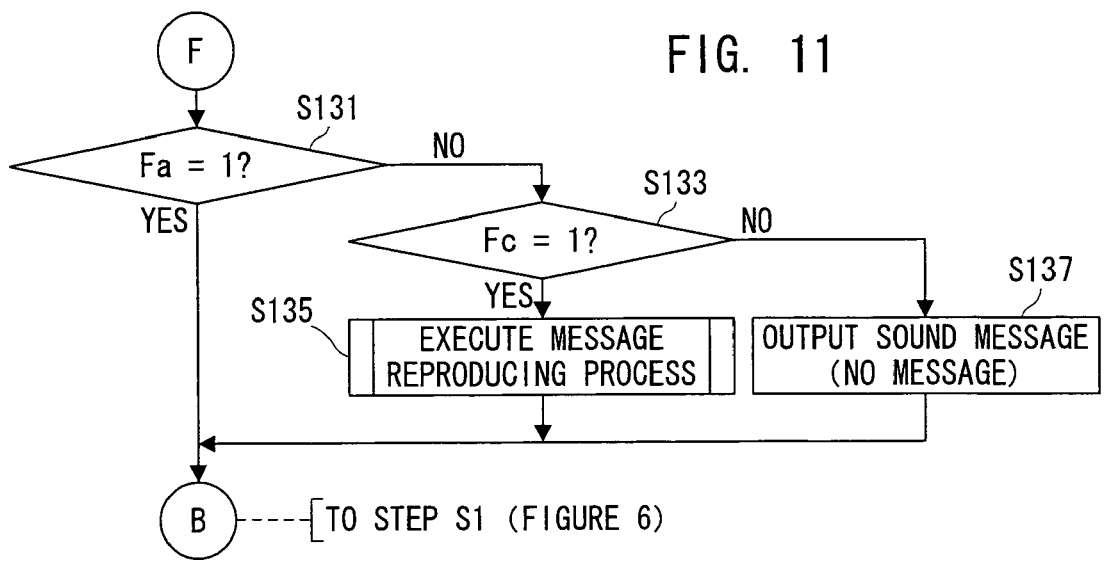

CONTENT REPRODUCTION DEVICE

TECHNICAL FIELD

The present invention relates to a contents reproducing apparatus. More specifically, the present invention relates to a contents reproducing apparatus having a telephone function.

Accordingly, in a case that there is a telephone call from the outside during receiving a program of the Internet radio, for example, the function as an Internet radio receiver is disabled once, and the function as an IP telephone has to be activated instead of this. Meanwhile, there is a so-called pay radio program needing a charge for listening to the program of the Internet radio. Thus, when there is a telephone call during receiving the pay program, the reception of the program is interrupted, causing a problem of a waste of money.

PRIOR ART

A number of techniques for integrating an apparatus for reproducing contents such as music, etc. and a telephone are conventionally proposed. For example, in Japanese Patent Laying-open No. 4-134952, a mobile telephone apparatus integrating a cassette tape recorder and/or a radio receiver is disclosed. By integrating the cassette tape recorder and/or radio receiver into the mobile telephone apparatus, it is possible to utilize the mobile telephone apparatus as a cassette tape recorder or a radio receiver during a stand-by time period.

By the way, along with the popularization of the Internet and broadbandization of communication lines, a so-called Internet radio broadcasting capable of delivering on the Internet programs similarly to radio broadcasting has recently come into practical use. Furthermore, in a telephone communication sector also, the Internet (IP: Internet Protocol) telephone service for making a communication by use of the Internet has been put to practical use. Similarly to the above-described prior art, it is convenient that both of the Internet radio receiver for receiving such the Internet radio broadcasting and the IP telephone for receiving the Internet telephone service are provided in an integrated manner. Also, since data (data including broadcast program, or data including telephone speech) is transmitted and received on the basis of the TCP/IP (Transmission Control Protocol/Internet Protocol) in both cases, it is possible to utilize a circuit portion for performing a decoding process in common, capable of realizing cost reduction of the apparatus.

However, when a part of the apparatus is utilized in common, the apparatus cannot simultaneously execute the functions as an Internet radio receiver and the function as an IP telephone. Accordingly, in a case that there is a telephone call from the outside during receiving a program of the Internet radio, for example, the function as an Internet radio receiver is disabled once, and the function as an IP telephone has to be activated instead of this. Meanwhile, there is a so-called pay radio program needing a charge for listening to the program of the Internet radio. Thus, when there is a telephone call during receiving the pay program, the reception of the program is interrupted, causing a problem of a waste of money.

SUMMARY OF THE INVENTION

Therefore, it is a primary object of the present invention to provide a novel contents reproducing apparatus with telephone function.

Another object of the present invention is to provide a contents reproducing apparatus capable of reproducing a pay content with no economic waste.

The present invention is a contents reproducing apparatus having a contents receiving function and a telephone function, comprises: a call detecting means for detecting reception of a calling instruction of a telephone; a first determining means for determining whether or not a pay content is being received now when the call detecting means detects the reception of the calling instruction; a mode switching means for switching to a telephone mode when it is determined that the pay content is not being received by the first determining means; and a disabling means for disabling a mode switch of the mode switching means when it is determined that the pay content is being received by the first determining means.

In the present invention, when there is an incoming from the opponent party, the mode switching means switches to the telephone mode in response thereto. It is noted that the mode switch by the mode switching means is disabled by the disabling means during receiving the pay content. That is, during receiving the pay content, even if there is a telephone call from the opponent party, an incoming signal is not output.

In one embodiment of the present invention, when there is the incoming from the opponent party during receiving the pay content, a returning means returns a busy signal to the opponent party in response thereto.

In another embodiment of the present invention, when there is an incoming from the opponent party during receiving the pay content, a send-back means sends a record guide message back to the opponent party in response thereto. Then, telephone speech in response to the record guide message from the opponent party is recorded by a recording means.

In the other embodiment of the present invention, the pay content is received by a receiving means. Then, the pay content received by the receiving means is reproduced in real time by the reproducing means.

BRIEF DESCRIPTION OF THE DRAWINGS

FIG. 10 is a flowchart continued from FIG. 6 via a different route from FIG. 9.

FIG. 11 is a flowchart continued from FIG. 6 via a different route from FIG. 10.

BEST MODE FOR PRACTICING THE INVENTION

Figure 1:
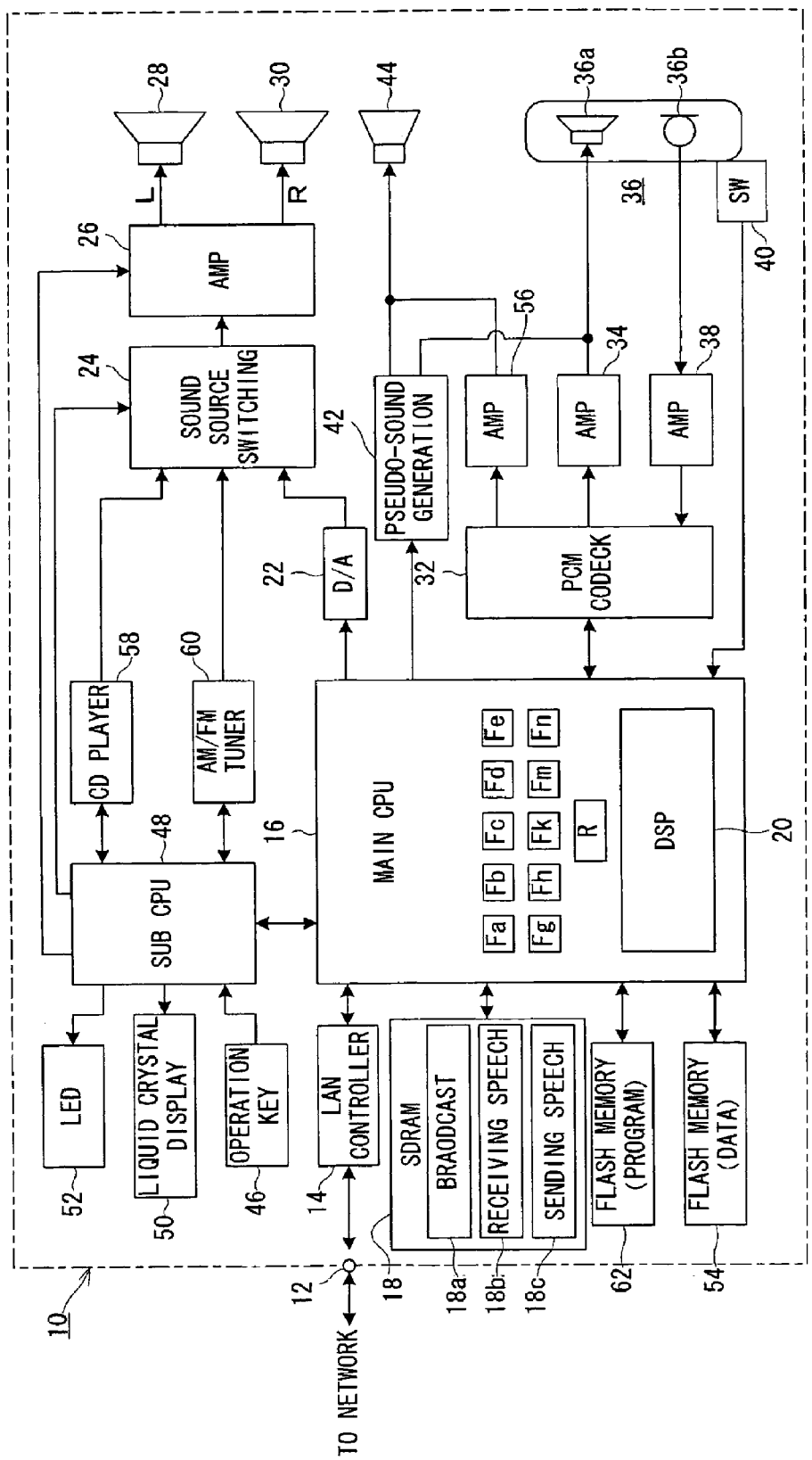
FIG. 1 is a block diagram showing a configuration of one embodiment of the present invention.

Referring to FIG. 1, a contents reproducing apparatus with telephone function (hereinafter, simply referred to as a contents reproducing apparatus) 10 is a fixed-type apparatus including a function as an Internet radio receiver and a function as an IP telephone, and provided with a communication connector 12 to be connected to a telephone line (strictly, ADSL (Asymmetric Digital Subscriber Line) modem not shown) via a communication cable not shown. The communication connector 12 is connected to a main CPU (Central Processing Unit) 16 via a LAN (Local Area Network) controller 14 within the contents reproducing apparatus 10. It is noted that the CPU 16 is formed of an ASIC (Application Specified IC).

When the contents reproducing apparatus 10 functions as the Internet radio receiver, the main CPU 16 becomes a radio mode. In the radio mode, the main CPU 16 fetches streaming data including broadcasting contents from radio packet signals being sequentially input via the LAN controller 14. Then, the fetched streaming data, that is, the broadcast data are sequentially stored in a broadcast data storing area 18a of an SDRAM (Synchronous Dynamic RAM) 18. When a data amount of the broadcast data stored in the broadcast data storing area 18a reaches a first threshold value, the main CPU 16 transfers the stored broadcast data to a DSP (Digital Signal Processor) 20 incorporated in itself. It is noted that the first threshold value here is of the order of 16 [kB]-32 [kB], for example, and corresponds to the data amount of the order of one seconds-two seconds in terms of time.

The broadcast data transferred to the DSP 20 is data compressed based on a well-known sound information compression system such as MP3 (MPEG-1/Audio Layer3) and WMA (Windows Media Audio Windows=registered trademark), and the DSP 20 decodes the compressed broadcast data to reproduce PCM (Pulse Code Modulation) data before the compression. The reproduced PCM data is input to a D/A converter 22, and converted into a sound signal being an analog electric signal. The converted sound signal is input to an amplifier circuit 26 via a sound source switching circuit 24 so as to be subjected to an amplifying process and then, input to respective speakers 28 and 30 on both sides. Thus, a sound (or music) of Internet radio broadcast is output in a real time manner from the respective speakers 28 and 30.

On the other hand, when the contents reproducing apparatus 10 functions as an IP telephone, the main CPU 16 becomes a telephone mode. In the telephone mode, the main CPU 16 fetches streaming data including contents of a receiving speech from telephone packet signals being sequentially input via the LAN controller 14. Then, the fetched streaming data, that is, receiving speech data are sequentially stored into a receiving speech data storing area 18b of the SDRAM 18. When a data amount of the receiving speech data stored in the receiving speech data storing area 18b reaches a second threshold value, the main CPU 16 transfers the stored receiving speech data to the DSP 20. It is noted that the second threshold value here is also a value approximately the same as the first threshold value (the order of 16 [kB]-32 [kB]), and corresponds to the data amount of the order of one seconds-two seconds in terms of time.

The receiving speech data transferred to the DSP 20 is compressed in a sound information compression format for communication such as the ADPCM (ITU-T Recommendation G.726) and the CS-CELP (ITU-T Recommendation G.729), and the DSP 20 decodes the compressed receiving speech data into PCM data according to a well-known μ-law (ITU-T Recommendation G.711) compression/expansion rules. The converted PCM data is input to a PCM codec 32, and subjected to a decoding process according to the μ-law compression/expansion rules so as to be converted into a sound signal being an analog electric signal, that is, a receiving speech signal. The converted receiving speech signal is input to a speaker 36a of a receiver 36 after being amplified by an amplifier circuit 34. Thus, a receiving speech sound is output in real time from the speaker 36a.

Furthermore, in the telephone mode, a sound input to a microphone 36b of the receiver 36, that is, a sending speech voice is converted into a sending speech signal being an analog electric signal by the microphone 36b. The converted sending speech signal is amplified by an amplifier circuit 38, and then, input to the PCM codec 32. The PCM codec 32 performs an encoding process according to the above-described μ-law compression/expansion rules on the input sending speech signal to generate PCM data, that is, sending speech data. The generated sending speech data are sequentially stored in a sending speech data storing area 18c of the SDRAM 18 in the DMA (Direct Memory Access) system. Specifically, at the same time that the above-described receiving speech data is decoded by the DSP 20, the sending speech data is sequentially stored in the sending speech data storing area 18c of the SDRAM 18. When the data amount of the sending speech data stored in the sending speech data storing area 18c reaches a third threshold value, and the receiving speech data is not subjected to a decoding process by the DSP 20, that is, the data amount of the receiving speech data in the receiving speech data storing area does not reach the second threshold value, the main CPU 16 transfers the sending speech data stored in the sending speech data storing area 18c to the DSP 20.

It is noted that the third threshold value is larger than the second threshold value, and is, for example, 64 [KB]-128 [KB]. However, the sending speech data stored in the sending speech data storing area 18c is data complying with the μ-law compression/expansion rules lower in compression ratio than the receiving speech data of the receiving speech data storing area 18b, and therefore, the third threshold value corresponds to the data amount of the order of one seconds-two seconds in terms of time similarly to the second threshold value.

The DSP 20 performs the encoding process complying with the above-described ADPCM format or CS-CELP format on the transferred sending speech data. Then, the main CPU 16 forms the encoded data into a packet signal complying with the TCP/IP, and inputs the formed packet signal to the LAN controller 14. The LAN controller 14 sends the input packet signal in an access system according to the Ethernet (registered trademark) standard via the communication connector 12. Thus, the packet signal including the sending speech data is transmitted to an opponent party for making a speech.

Figures 2, 3, 4, 5:
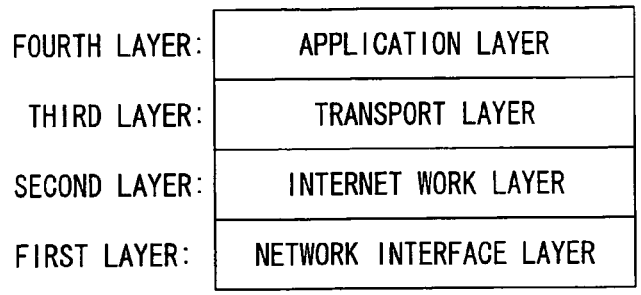
FIG. 2 is an illustrative view showing a configuration of a packet transmitted or received in FIG. 1 embodiment.
FIG. 3 is an illustrative view showing one display state of the liquid crystal display.
FIG. 4 is an illustrative view showing a display state different from that in FIG. 3.
FIG. 5 is an illustrative view showing a display state different from FIG. 3 and FIG. 4.

It is noted that the radio packet signal input to the main CPU 16 via the LAN controller 14 in the radio mode and the telephone packet signal input to the main CPU 16 via the LAN controller 14 in the telephone mode also comply with the above-described TCP/IP. The packet signal complying with the TCP/IP has four layers including the first to fourth layers as shown in FIG. 2.

The first layer being the lowest layer is called a "network interface layer". In the "network interface layer", information relating to an apparatus actually connected to the network (Interne, here) such as the MAC (Media Access Control) address, an interface standard (Ethernet standard, here) adapted to the apparatus, etc. is stored. The second layer is called an "Internet work layer", and in the "Internet work layer", information required for sending a packet signal to the opponent party such as information relating to addressing and routing, etc. is stored. The third layer is called a "transport layer", and in the "transport layer", information for retaining reliability of communication between a sender and a receiver such as an order of the packet signal, error correction, retransmission control in a case of occurrence of an error, etc. is stored. Then, the fourth layer being the highest layer is called an "application layer", and in the "application layer", data to be transmitted and received such as the broadcast data in the radio mode and the receiving speech data or the sending speech data in the telephone mode, etc. is stored. Furthermore, in the "application layer", various instructions such as a charge starting instruction, a calling instruction, etc. described later are also stored.

Meanwhile, when receiving a telephone call in the radio mode, that is, when receiving a telephone packet signal including a calling instruction indicating that there is a telephone call from an arbitrary opponent party via the LAN controller 14, the main CPU 16 shifts from the radio mode to the telephone mode. Then, an incoming instruction for informing the opponent party of arriving a calling instruction is generated, and a packet signal including the incoming instruction in the above-described "application layer" is further generated. The generated packet signal is input to the LAN controller 14. Thus, the telephone packet signal including the incoming instruction is transmitted to the opponent party, and it is recognized that the calling instruction is arrived at this side (calling destination) by the opponent party.

The main CPU 16 further controls a pseudo-sound generating circuit 42 to output an incoming tone as an incoming signal from the speaker 44. This incoming tone continues to be output until the receiver 36 is held to change a hook switch 40 into an off-hook state, that is, until an operator answers the telephone. Then, when the hook switch 40 becomes the off-hook state, the main CPU 16 generates a response instruction indicative of responding to the calling from the opponent party, and further generates a packet signal including the response instruction in the "application layer". Then, the generated packet signal is input to the LAN controller 14. Thus, the telephone packet signal including the response instruction is transmitted to the opponent party to establish a communication with the opponent party.

It is noted that when the opponent party hangs off before the operator takes the telephone, that is, when the telephone packet signal including an end speech instruction indicative of being rung off by the opponent party during the output of the incoming tone is received via the LAN controller 14, the CPU 16 generates a similar end speech instruction. Then, a packet signal including this end speech instruction in the "application layer" is generated, and the generated packet signal is input to the LAN controller 14. Thus, the telephone packet signal including the end speech instruction is transmitted to the opponent party, and a communication performance with the opponent party is ended (before an actual communication is performed). Furthermore, the main CPU 16 controls the pseudo-sound generating circuit 42 to stop outputting the incoming tone from the speaker 44. Thereafter, the telephone mode is shifted to the radio mode.

Also, when the receiver 36 is lifted to change the hook switch 40 to the off-hook state in the radio mode, the main CPU 16 shifts from the radio mode to the telephone mode. Then, the pseudo-sound generating circuit 42 is controlled to output a dial tone from the speaker 36*a* of the receiver 36. The dial tone is continued to be output until a dialing operation described later is made by the operation key 46. It is noted that when the hook switch 40 is shifted to the on-hook state before the dialing operation is made, the main CPU 16 controls the pseudo-sound generating circuit 42 to stop the output of the dial tone from the speaker 36*a*. Then, the telephone mode is shifted to the radio mode.

When the dialing operation is made as described above, the main CPU 16 generates a calling instruction for calling the opponent party designated by the dialing operation. A packet signal including the calling instruction in the "application layer" is generated, and the generated packet signal is input to the LAN controller 14. Thus, the telephone packet signal including the calling instruction is transmitted to the opponent party.

When in response to the transmission of the telephone packet signal including this calling instruction, a telephone packet signal including the incoming instruction similarly to the above-description is transmitted from the opponent party, the main CPU 16 controls the pseudo-sound generating circuit 42 to output a calling sound from the speaker 36*a* of the receiver 36. The calling sound continues to be output until a telephone packet signal including a response instruction similarly to the above description is transmitted from the opponent party, that is, until the opponent party answers the telephone. Then, when the telephone packet signal including the response instruction is received, the main CPU 16 controls the pseudo-sound generating circuit 42 to stop outputting the calling sound from the speaker 36*a*. This enables establishment of a communication with the opponent party.

It is noted that in a case that the line is busy on the opponent party side at a time that the telephone packet signal including the calling instruction is transmitted, a telephone packet signal including a busy instruction as a busy signal is transmitted from the opponent party. In this case, the main CPU 16 controls the pseudo-sound generating circuit 42 to output a busy tone from the speaker 36*a* of the receiver 36. The busy tone continues to be output until the hook switch 40 is shifted to the on-hook state. Similarly, the main CPU 16, when receiving a telephone packet signal including the above-described calling instruction in the telephone mode, transmits a telephone packet signal including the busy instruction to a transmitting side of the telephone packet signal. Thus, it is possible for the transmitting side to confirm the line is busy on this side.

Furthermore, in a case that a telephone number designated by the dialing operation is a missing number, a telephone packet signal including the missing number is sent from an arbitrary server in the Internet (en route). In this case, the main CPU 16 controls the pseudo-sound generating circuit 42 to output a sound message indicating that designated telephone number is a missing number (error) from the speaker 36*a* of the receiver 36. The sound message also continues to be output until the hook switch 40 shifted to the on-hook state.

When the opponent party hangs up in a state a communication is established with the opponent party, a telephone packet signal including an end speech instruction similarly to the above description is transmitted from the opponent party. When receiving the telephone packet signal, the main CPU 16 controls the pseudo-sound generating circuit 42 to output a busy tone from the speaker 36*a* of the receiver 36. The busy tone continues to be output until the hook switch 40 shifts to the on-hook state. Then, when the hook switch 40 is shifted to the on-hook state, the main CPU 16 generates a similar telephone packet signal including the end speech instruction, and inputs the generated telephone packet signal to the LAN controller 14. Thus, the telephone packet signal including the end speech instruction is transmitted to the opponent party to end a series of communication performance with the opponent party. Then, the main CPU 16 shifts from the telephone mode to the radio mode.

On the other hand, when the hook switch 40 is shifted to the on-hook state before the opponent party hangs up in a state communication is established, the main CPU 16 generates a telephone packet signal including the end speech instruction as described above, and inputs the generated telephone packet signal to the LAN controller 14. Thus, the telephone packet signal including the end speech instruction is transmitted to the opponent party. In response to the transmission of the telephone packet signal, when receiving a similar telephone packet signal including the end speech instruction from the opponent party, the main CPU 16 ends a series of communication performances. Then, the telephone mode is shifted to the radio mode.

Furthermore, the contents reproducing apparatus 10 in this embodiment includes a sub CPU 48 in addition to the main CPU 16. The sub CPU 48 is in charge of a so-called man-machine interface, and the above-described operation key 46 is connected to the sub CPU 48.

Specifically, when a dialing operation is performed in the telephone mode as described above, the sub CPU 48 informs the main CPU 16 of the content of the dialing operation. The main CPU 16 generates the above-described calling instruction on the basis of the content of the dialing operation informed by the sub CPU 48.

Alternatively, when the main CPU 16 is in the radio mode, it can arbitrarily select a receiving channel (station) by an operation of the operation key 46. More specifically, when an arbitrary channel is selected by an operation of the operation key 46, the sub CPU 48 informs the main CPU 16 of information relating to the selected channel. The main CPU 16 generates a channel selecting instruction for accessing the selected channel on the basis of the information informed by the sub CPU 48. Then, a packet signal including the channel selecting instruction that is incorporated in the "application layer" is generated, and the generated packet signal is input to the LAN controller 14. Thus, the radio packet signal including the channel selecting instruction is transmitted to a broadcast station (server) designated by the channel selecting instruction, and a radio packet signal including broadcast data is transmitted from the broadcast station.

The sub CPU 48 is also connected with a liquid crystal display 50. When the main CPU 16 is in the radio mode, the sub CPU 48 displays on the liquid crystal display 50 information indicative of a current receiving circumstance such as a name of the selecting receiving channel, a compression format of the broadcast data on reception, etc.

Then, when there is a telephone call from an arbitrary opponent party and thus the main CPU 16 is changed to the telephone mode, the sub CPU 48 displays an incoming message shown in FIG. 3 on the liquid crystal display 50. That is, a string of letters 70 written in horizontal and indicative of an incoming state of the telephone, a string of letters 72 written in horizontal and indicative of an incoming time and date, and a string of letters 74 written in horizontal and indicative of a telephone number of the opponent party are displayed in vertically three columns. It is noted that, although not illustrated, in a case that the opponent party makes a telephone call in a mode that a telephone number is not notified, or makes a telephone call from a public telephone, a string of letters indicative of so is displayed in place of the letter string 74. Then, when the receiver 36 is lifted to shift the hook switch 40 to the off-hook state, the sub CPU 48 displays on the liquid crystal display 50 an under-communication message indicative of a communication time period and being under communication. Then, after the communication is completed, if the main CPU 16 is shifted from the telephone mode to the radio mode, information indicative of a current receiving state of an Internet radio broadcasting is displayed on the liquid crystal display 50 in a manner similar to the above description.

Furthermore, if the receiver is lifted-to switch the hook switch 40 to the off-hook state when the main CPU 16 is in the radio mode, the sub CPU 48, although not illustrated, displays a so-called dialing waiting message indicative of waiting a dial operation by the operation key 46 on the liquid crystal display 50. Then, when the dial operation is performed, the telephone number of a designated opponent party and a calling message indicating that the opponent party is under calling are displayed on the liquid crystal display 50. Then, when the opponent party answers the telephone to establish a communication, the above-described under-communication message is displayed.

Furthermore, the sub CPU 48 is also connected with a light-emitting diode (LED) 52. The sub CPU 48 blinks the light-emitting diode 52 when there is a telephone call from the opponent party. When the receiver 36 is lifted to shift the hook switch 40 to the off-hook state, the sub CPU 48 turns the light-emitting diode 52 on. The lighting state of the light-emitting diode 52 continues until the receiver 36 is put down to shift the hook switch 40 to the on-hook state. Then, when the hook switch 40 is shifted to the on-hook state, and a communication performance with the opponent party is ended, the light-emitting diode 52 is turned off. It is noted that when the opponent party disconnects the telephone in a state that the light-emitting diode 52 is in a blinking state also, the light-emitting diode 52 is turned off.

The contents reproducing apparatus of this embodiment 10 is also provided with an answering telephone function. Whether the answering telephone function is to be turned on (validated) or not is set by the operation of the operation key 46. At a time that the answering telephone function is turned on, when there is a telephone call from the opponent party, that is, when the above-described telephone packet signal including a calling instruction is sent, the main CPU 16 sends to the opponent party the above-described telephone packet signal including a response instruction in response thereto. Next, a telephone packet signal including responding message data as a record guide message that is incorporated in the "application layer" is sent to the opponent party. The responding message data is data compressed on the basis of the above-described communication sound information compression system, and the responding message data includes data for informing with voice this side of being absent here and not answering the telephone, and preparing for accepting a voice message from the opponent party. It is noted that the responding message data is divided into N in a time-division manner, and each of the time-divided N data is transmitted in a state that each data is included in respective one of (N) telephone packet signals.

When in response to the transmission of the telephone packet signal including the responding message data, a telephone packet signal including the receiving speech data as a voice message is sent from the opponent party, the main CPU 16 fetches the receiving speech data from the telephone packet signal, and records the fetched receiving speech data in the flash memory 54. Then, when the opponent party rings off the receiver, and therefore, a telephone packet signal including the end speech instruction as described above is received, a telephone packet signal including a similar end speech instruction is transmitted to the opponent party to end a series of communication performances. It is noted that while the telephone packet signal including the responding message data is transmitted to the opponent party, that is, the opponent party reproduces a responding message according to the responding message data, in a case that the opponent party disconnects the telephone, the main CPU 16 directly transmits a telephone packet signal including the end speech instruction to the opponent party to end the communication performances.

In a case that there is a telephone call while the answering telephone function is turned on, the above-described incoming message shown in FIG. 3 is also displayed on the liquid crystal display 50. Then, in a case that the receiving speech data transmitted from the opponent party is recorded on the flash memory 54, that is, in a case that the voice message is recorded, a voice message acceptance message shown in FIG. 4 is displayed on the liquid crystal display 50 after the communication performance. That is, a string of letters 80 written in horizontal and indicative of presence of an incoming and record of the voice message, a string of letters 82 written in horizontal and indicative of an incoming time and date, and a string of letters 84 written in horizontal and indicative of a telephone number of the opponent party are displayed in vertical three columns.

It is noted that in a case that the voice message from the opponent party is not recorded, after completion of the communication performance, a call history message shown in FIG. 5 is displayed on the liquid crystal display 50. That is, a string of letters 90 in written horizontal and indicative of presence of an incoming 90, a string of letters 92 written in horizontal and indicative of an incoming date, and a string of letters 94 written in horizontal indicative of a telephone number of the opponent party are displayed in vertical three columns. It is noted that in a case that as to the voice message acceptance message in FIG. 4 and the call history message in FIG. 5, the opponent party makes a telephone call in the mode that a telephone number is not notified, or makes a telephone call from a public telephone, similarly to the case of the incoming message in FIG. 3, a string of letters indicative of so is displayed in place of the strings of letters 84 or 94. The information displayed in these message, that is, the information relating to an opponent party who makes a telephone call, an incoming time, and presence or absence of the voice message are also recorded in the flash memory 54.

Furthermore, in a case that there is a telephone call when the answering telephone function is turned on, the light-emitting diode 52 blinks as described above. The blinking state of the light-emitting diode 52 is continued until the communication performance with the opponent party is completed. Then, after completion of the communication performance with the opponent party, the light-emitting diode 52 is turned off.

It is noted that even if the answering telephone function is turned on, the receiver 36 is lifted to shift the hook switch 40 to the off-hook state when there is a telephone call from the opponent party, a communication with the opponent party is established. Furthermore, even if the answering telephone function is turned on, it is possible to make a telephone call to an arbitrary opponent party in the above-described procedure (dial operation).

The voice message recorded by means of the answering telephone function is reproduced when a voice message reproducing operation is performed by the operation key 46. That is, when the voice message reproducing operation is preformed, the main CPU 16 sequentially reads receiving speech data recorded in the flash memory 54. Then, the read receiving speech data are sequentially stored in the receiving speech data storing area 18b of the SDRAM 18. When a data amount stored in the receiving speech data storing area 18b reaches the second threshold value, the main CPU 16 transfers the stored receiving speech data to the DSP 20. The DSP 20 decodes the transferred receiving speech data into PCM data. The converted PCM data is subjected to a decoding process according to the law compression/expansion system by the PCM codec 32 so as to be converted into a sound signal. The converted sound signal is input to the speaker 36a of the receiver 36 via the amplifier circuit 34, and input to the speaker 44 via another amplifier circuit 56. Thus, the voice message is output from both of the speakers 36a and 44. It is noted that in a case that the voice message is not recorded, the main CPU 16 controls the pseudo-sound generating circuit 42 to output a sound message indicative of so from the speakers 36a and 44.

When a voice message eliminating operation is performed by the operation key 46, the main CPU 16 eliminates all the receiving speech data recorded in the flash memory 54. Then, the pseudo-sound generating circuit 42 is controlled so as to output a sound message indicative of eliminating the voice message from the speaker 44. It is noted that in a case that the receiving speech data as a voice message is not recorded in the flash memory 54, the sound message is not output. Furthermore, the main CPU 16 instructs the sub CPU 48 to clear a display of the liquid crystal display 50. Thus, in a case that the above-described voice message acceptance message in FIG. 4 or call history message in FIG. 5 is displayed on the liquid crystal display 50, the display is cleared.

Meanwhile, there is a pay program in the Internet radio broadcasting as described above. During receiving such the pay program, if the main CPU 16 switches from the radio mode to the telephone mode when there is a telephone call, for example, the reception of the pay program is interrupted. Here, in a case that the pay program is a program for delivering a music content, and in a case that a pay-as-you-use charging system of charging depending on the number of musics of the received music content or a receiving time period of the pay program is adopted, the pay spent by then is a waste of money, and therefore, being extremely uneconomical.

Therefore, in a case that the program during reception is the pay program, even if there is a telephone call, the main CPU 16 does not shift from the radio mode to the telephone mode, and the reception of the pay program is continued. It is noted that the response to the opponent party who makes a telephone call is different depending on whether or not the above-described answering telephone function is turned on. That is, in a case that the answering telephone function is not turned on, a telephone packet signal including sound data informing the opponent party that it is unable to communicate due to the reception of the pay content on this side by a voice is sent. Thus, it is possible to inform the opponent party so.

On the other hand, in a case that the answering telephone function is turned on, the answering telephone function works as above-described procedure. That is, a telephone packet signal including the response instruction is transmitted to the opponent party, and then, a telephone packet signal including the responding message data is transmitted. Then, when a telephone packet signal including the receiving speech data as a voice message is sent from the opponent party, the receiving speech data is recorded in the flash memory 54. At this time, a message as described above is displayed on the liquid crystal display 50, and the light-emitting diode 52 blinks as described above.

It is noted that at a start of receiving the pay program, a radio packet signal in which a charge starting instruction is incorporated in the above-described "application layer" is first sent. The main CPU 16 detects the charge starting instruction to recognize a reception starting time point of the pay program. Furthermore, at a completion of receiving the pay program, a radio packet signal including a charge ending instruction that is incorporated in the "application layer" is sent. The main CPU 16 detects the charge ending instruction to recognize a reception ending time point of the pay program.

Furthermore, the contents reproducing apparatus 10 of this embodiment is provided with a CD (Compact Disc) player 58 and an AM/FM tuner 60. According to the operation of the operation key 46, a sound (or music) taking any one of the CD player 58 and the AM/FM tuner 60 as the sound source can be output from the speakers 28 and 30.

That is, when an operation taking any one of the CD player 58 and the AM/FM tuner 60 as a sound source is performed according to an operation of the operation key 46, the sub CPU 48 controls the sound source switching circuit 24 such that an analog sound signal output from a side as the sound source is input to the amplifier circuit 26. Thus, a sound taking any one of the CD player 58 and the AM/FM tuner 60 as the sound source is output from the speakers 28 and 30. It is noted that even in a state that the CD player 58 or the AM/FM tuner 60 is being taken as a sound source, when there is a telephone call or the receiver 36 is lifted to change the hook switch 40 to the off-hook state, the main CPU 16 switches to the telephone mode.

Furthermore, in a case that a volume adjustment operation is performed by the operation key 46, the sub CPU 48 controls a gain of the amplifier circuit 26 according to the operation.

The contents reproducing apparatus 10 of this embodiment is also provided with a flash memory 62 in addition to the above-described flash memory 54. As described above, the flash memory 54 is used as a so-called data recording memory for recording receiving speech data as information in the answering telephone function while the flash memory 62 is used as a program memory. Specifically, in the flash memory 62, a control program (firmware) for controlling an operation of the main CPU 16 is stored. Also stored in the flash memory 62 is so-called pseudo sound data for outputting an incoming tone, a dial tone, a calling sound, a busy tone, and various sound messages by the above-described pseudo-sound generating circuit 42. Furthermore, also stored in the flash memory 62 are the responding message data in the answering telephone function and the sound data for informing the opponent party of being unable to make a communication due to the reception of the pay content.

The main CPU 16 executes the respective processes according to the above-described control program shown in flowcharts in FIG. 6-FIG. 17 when a setting of receiving the Internet radio broadcast is made. It is noted that directly after the power supply of the contents reproducing apparatus 10 of this embodiment is turned on, "0" is set to each of flags Fa, Fb, Fc, Fd, Fe, Fg, Fh, Fk, Fm and Fn described later. These flags Fa, Fb, Fc, Fd, Fe, Fg, Fh, Fk, Fm and Fn are built in the main CPU 16. Furthermore, in the main CPU 16, a register R described later is also incorporated.

Figure 6:
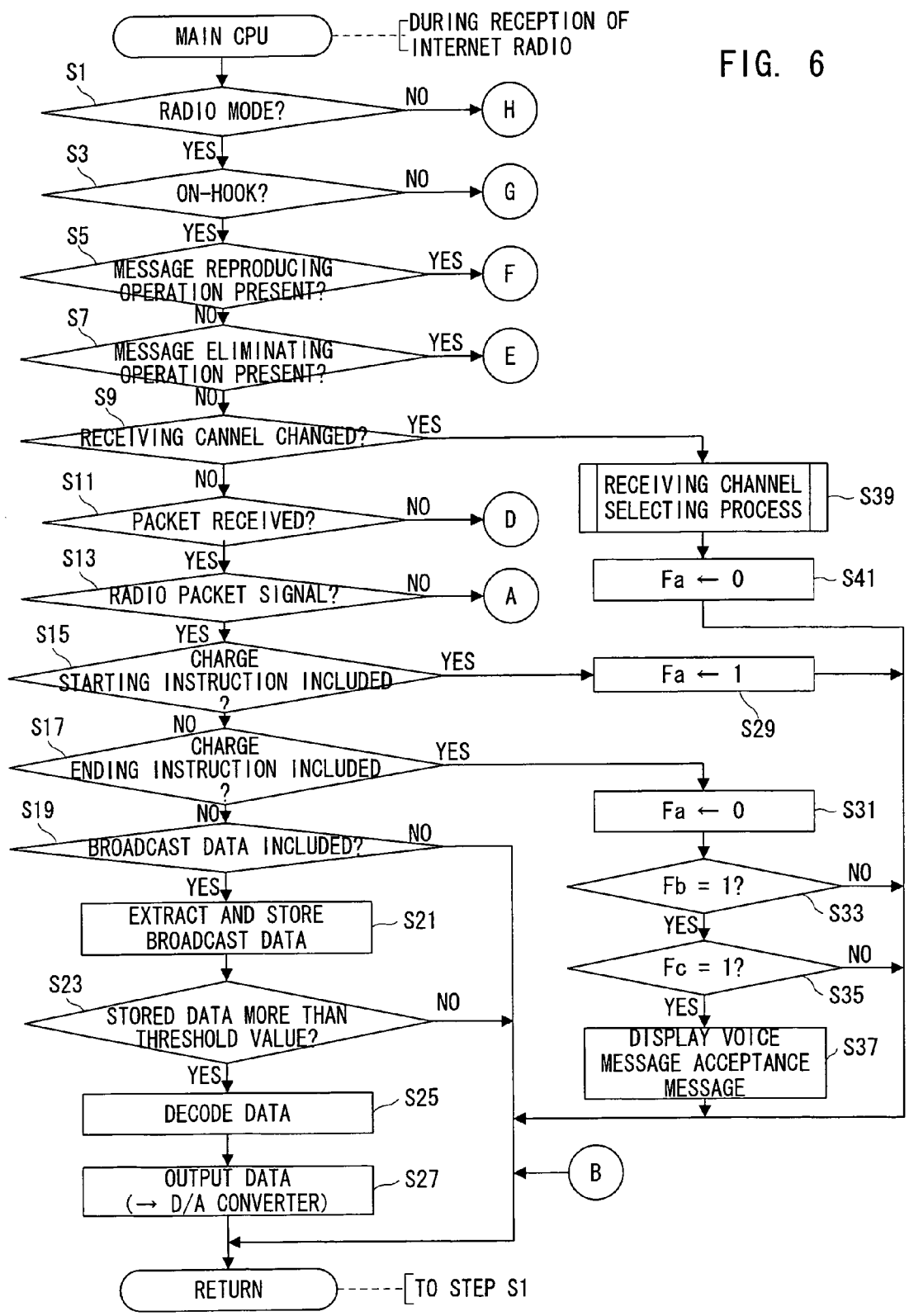
FIG. 6 is a flowchart showing a part of an operation of a main CPU in FIG. 1.

Referring to FIG. 6, the main CPU 16 first determines whether or not a current mode is a radio mode in a step S1. Here, when it is determined to be the radio mode, the process proceeds to a step S3 to determine whether or not the hook switch 40 is in the on-hook state.

When the hook switch 40 is in the on-hook state, the main CPU 16 proceeds from the step S3 to a step S5 to determine whether or not a voice message reproducing operation is performed by the operation key 46. The determination is performed on the basis of information applied from the sub CPU 48 as described above. In a case that the voice message reproducing operation is not performed in the step S5, the process proceeds to a step S7 to determine whether or not a voice message eliminating operation is performed by the operation key 46. In a case that the voice message eliminating operation is not performed, the process further proceeds to a step S9.

In the step S9, the main CPU 16 determines whether or not a selecting (changing) operation of the receiving channel is performed by an operation of the operation key 46. In a case that such the selection is not performed, it is determined whether or not any packet signal is received via the LAN controller 14 in a step S11. Here, if it is determined that any packet signal is received, the process proceeds to a step S13 to determine whether or not the received packet signal is a radio packet signal.

If it is determined that the radio packet signal is received in the step S13, the main CPU 16 determines whether or not the above-described charge starting instruction is included in the radio packet signal in a step S15. Here, in a case that the charge starting instruction is not included, it is determined whether or not the charge ending instruction is included in a step S17.

When it is determined that the charge ending instruction is not included in the radio packet signal in the step S17, the main CPU 16 proceeds to a step S19 to determine whether or not broadcast data is included in the radio packet signal. Here, in a case that the broadcast data is not included, the process goes through the flowchart once to repeat from the step S1. On the other hand, in a case that the broadcast data is included, the broadcast data is extracted from the radio packet signal in a step S21, and the extracted broadcast data is stored in the broadcast data storing area 18a of the SDRAM 18. Then, it is determined whether or not a data amount of the broadcast data stored in the broadcast data storing area 18a reaches the first threshold value in a step S23.

In a case the broadcast data in the broadcast data storing area 18a does not reach the first threshold value, the main CPU 16 goes through the flowchart at a time to repeat from the step S1. On the other hand, in a case that the broadcast data in the broadcast data storing area 18a reaches the first threshold value, the process proceeds from the step S23 to a step S25 to transfer the broadcast data in the broadcast data storing area 18a to the DSP 20 so as to be decoded. Then, PCM data reproduced by the decoding is output to the D/A conversion circuit 22 in a step S27. Consequently, a sound of Internet radio broadcast is output from the speakers 28 and 30.

In a case that the charge starting instruction is included in the radio packet signal in the above-described step S15, the main CPU 16 proceeds to a step S29 to set "1" in the flag Fa. The flag Fa is an index for indicating whether or not a pay broadcast (pay program) is being received now, and when the flag Fa is "1", this means that the pay broadcast is being received now. On the other hand, if the flag Fa is "0", this means that the pay broadcast is not being received now. After completion of the process in the step S29, the main CPU 16 goes through the flowchart to repeat from the step S1.

Furthermore, in a case that the charge ending instruction is included in the radio packet signal in the above-described step S17, the main CPU 16 proceeds to a step S31 to set "0" in the flag Fa. Then, it is determined whether or not "1" is set in the flag Fb in a step S33. The flag Fb is an index for indicating whether or not there is an incoming from the outside during receiving the pay broadcast, and when the flag Fb is "1", this means that there is an incoming. On the other hand, when the flag Fb is "0", this means that there is not an incoming during receiving the pay broadcast. When the flag Fb is not "1", that is, when there is no incoming during receiving the pay broadcast, the main CPU 16 goes through the flowchart to repeat from the step S1. On the other hand, when the flag Fb is "1", the process proceeds to a step S35.

In the step S35, the main CPU 16 determines whether or not "1" is set in the flag Fc. The flag Fc is an index for indicating whether or not a record of a voice message by the above-described answering telephone function is performed in the telephone call arrived during receiving the pay broadcast, and when the flag Fc is "1", this means that the voice message is recorded. On the other hand, when flag Fc is "0", the voice message is not recorded. When the flag Fc is not "1", that is, when the voice message is not recorded, the main CPU 16 goes through the flowchart to repeat from the step Si. On the other hand, when the flag Fc is "1", the sub CPU 48 is informed that the above-described voice message acceptance message in FIG. 4 is displayed on the liquid crystal display 50 in a step S37, and then, the process goes through the flowchart.

Furthermore, in a case that the receiving channel selecting operation is performed in the above-described step S9, the main CPU 16 executes a receiving channel selecting process in a step S39. That is, a channel selecting instruction according to a channel selected by the operation key 46 is generated, and a radio packet signal including the channel selecting instruction is generated. Then, the generated radio packet signal is input to the LAN controller 14. Consequently, the radio packet signal is transmitted to the broadcast station corresponding to the selected channel, and a radio packet signal including broadcast data is sent from the broadcast station. After completion of the process in the step S39, the main CPU 16 sets "0" in the above-described flag Fa in a step S41, and then, the process goes through the flowchart to repeat from the step S1.

Figure 7:
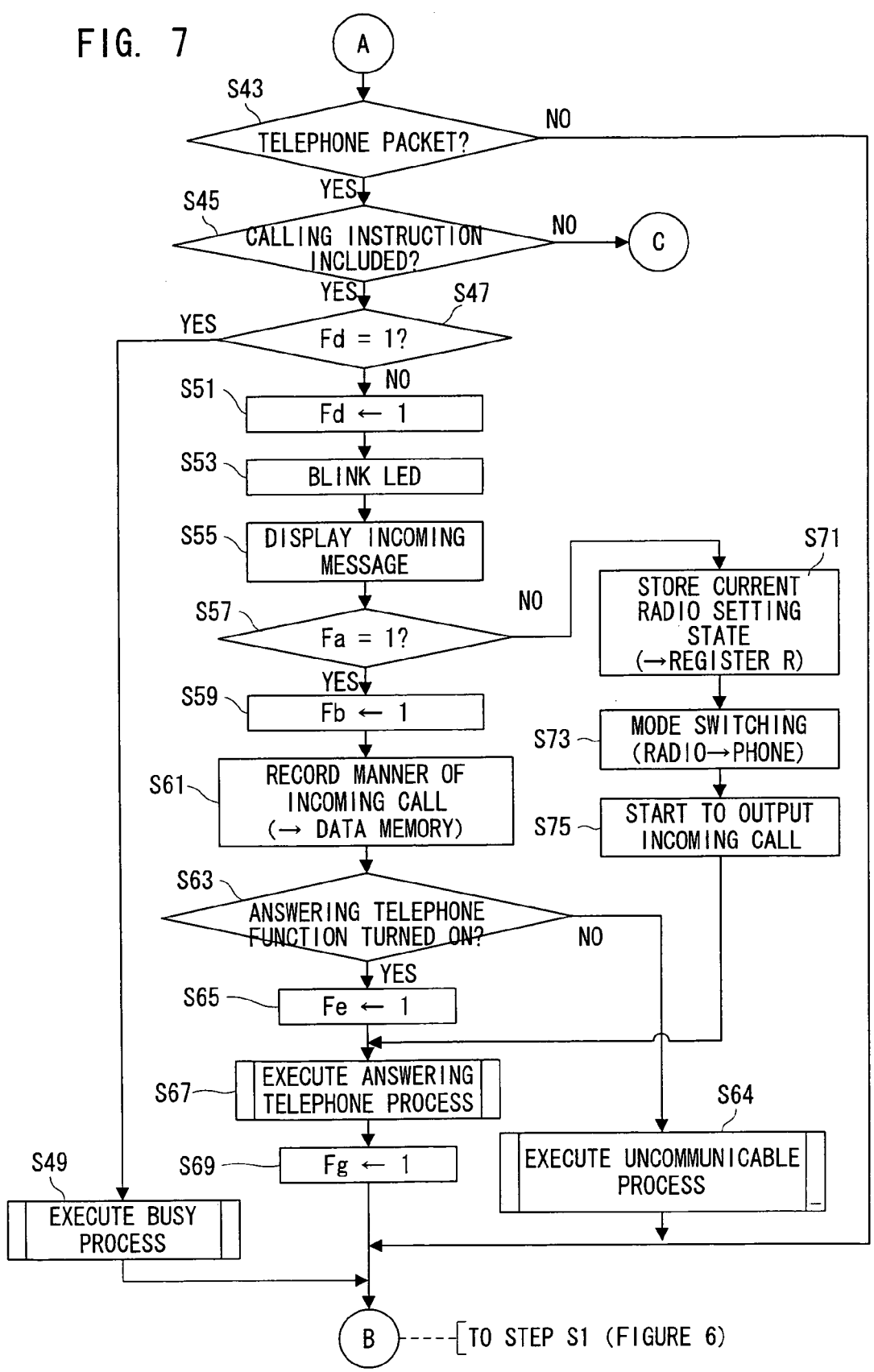
FIG. 7 is a flowchart continued from FIG. 6.

In the above-described step S13, it is determined that the received packet signal is not a radio packet signal, the main CPU 16 proceeds to a step S43 in FIG. 7. Then, it is determined whether or not the received packet signal is a telephone packet signal in the step S43. Here, in a case that it is not the telephone packet signal, the process goes through the flowchart to repeat from the step S1. On the other hand, in a case that the received packet signal is the telephone packet signal, the process proceeds from the step S43 to a step S45.

In the step S45, the main CPU 16 determines whether or not a calling instruction is included in the received telephone packet signal. Here, in a case that the calling instruction is included, the process proceeds to a step S47 to determine whether or not "1" is currently set in the above-described flag Fd. The flag Fd is an index for indicating whether or not the pay broadcast is being received now, and there is an incoming from the opponent party, and when the flag Fd is "1", this means that the pay broadcast is being received now, and it is in the incoming state from the opponent party. On the other hand, when the flag Fd is "0", this means that it is not in such the state. When the flag Fd is "1", the main CPU 16 executes a busy process in a step S49.

That is, a telephone packet signal including the above-described busy instruction is generated, and the generated telephone packet signal is input to the LAN controller 14. Thus, this informs the opponent party that the line is busy now. After completion of the process in the step S49, the main CPU 16 goes through the flowchart to repeat from the step S1.

On the other hand, in a case that "1" is not set in the flag Fd in the step S47, the main CPU 16 proceeds to a step S51 to set "1" in the flag Fd. Then, the sub CPU 48 is informed that the light-emitting diode 52 is blinked in a step S53, and the sub CPU 48 is informed that the above-described incoming message in FIG. 3 is displayed on the liquid crystal display 50 in a step S55. Then, in a step S57, it is determined whether or not "1" is set in the above-described flag Fa.

Here, in a case that "1" is set in the flag Fa, that is, in a case that the pay broadcast is being received now, the main CPU 16 proceeds to a step S59 to set "1" in the above-described flag Fb. Then, in a step S61, incoming information, that is, information relating to the opponent party making a telephone call, an incoming time, and presence or absence of a voice message is recorded in the flash memory 54. Furthermore, in a step S63, it is determined whether or not the answering telephone function is turned on.

In a case that the answering telephone function is not turned on in the step S63, the main CPU 16 executes an uncommunicable process in a step S64. That is, as described above, a telephone packet signal including sound data for informing by a voice the opponent party of being in an uncommunicable state due to receiving the pay content on this side is sent. Then, after executing the uncommunicable process, the process goes through the flowchart to repeat from the step Si in FIG. 6.

The above-described busy process in the step S49 is executed. In a case that the answering telephone function is turned on, the process proceeds from the step S63 to a step S65 to set "1" in the flag Fe. The flag Fe is an index for indicating whether or not the answering telephone function is turned on, and when the flag Fe is "1", this means that the answering telephone function is turned on. On the other hand, when the flag Fe is "0", this means that the answering telephone function is turned off.

After completion of the process in the step S65, the main CPU 16 executes an answering telephone process in a step S67. Specifically, a telephone packet signal including the response instruction is transmitted to the opponent party, and a telephone packet signal including the above-described responding message data is sent to the opponent party. Thus, a responding message is reproduced at the opponent party.

Then, the main CPU 16 sets "1" in the flag Fg in a step S69, and goes through the flowchart to return to the step S1. It is noted that when the flag Fg is an index for indicating whether or not an incoming is being arrived now, and when the flag Fg is "1", this means that the incoming is being arrived. On the other hand, in a case that the flag Fg is "0", this means that the incoming is not being arrived.

In a case that "1" is not set in the flag Fa in the above-described step S57, that is, in a case that the pay broadcast is not being received now, the main CPU 16 proceeds to a step S71. Then, a setting state as the current Internet radio receiver, that is, a current receiving channel and volume (gain of the amplifier circuit 26) is stored in the above-described register R. Then, after the radio mode is turned to the telephone mode in a step S73, the pseudo-sound generating circuit 42 is controlled to output the above-described incoming tone in a step S75, and then, the process proceeds to the step S67.

Figure 8:
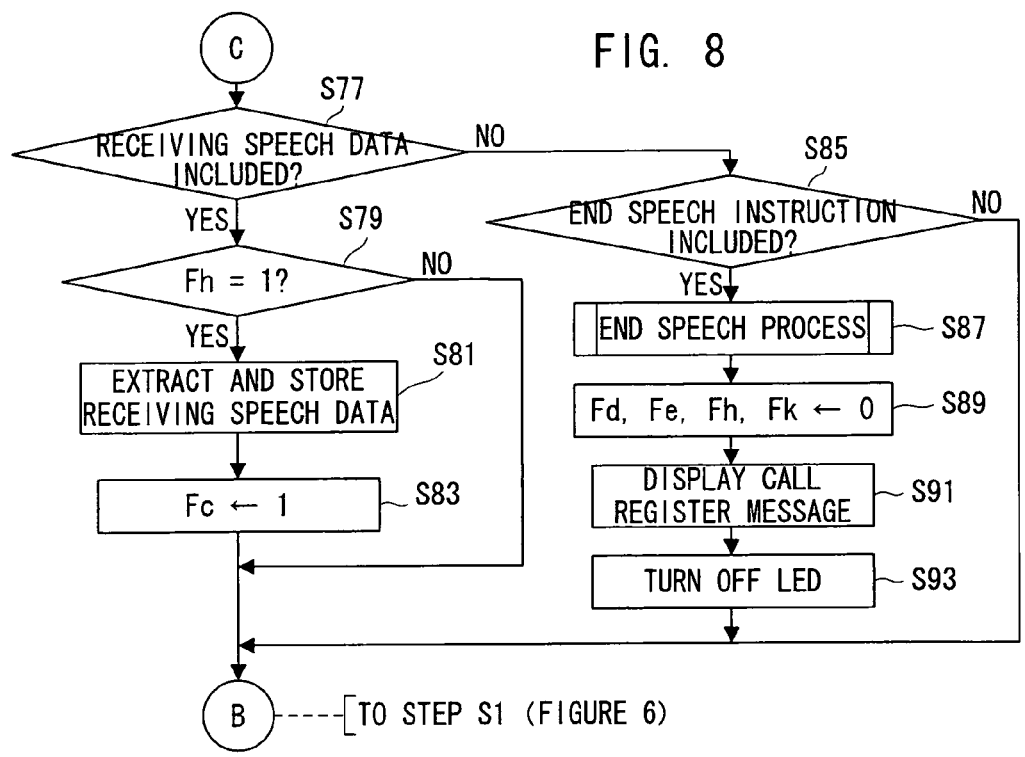
FIG. 8 is a flowchart continued from FIG. 7.

Furthermore, when determining that the calling instruction is not included in the telephone packet signal in the above-described step S45, the main CPU 16 proceeds to a step S77 in FIG. 8. Then, it is determined whether or not the receiving speech data as a voice message is included in the telephone packet signal. Here, in a case that the receiving speech data is included, the process proceeds to a step S79 to determine whether or not "1" is set in the flag Fh. The flag Fh is an index for indicating whether or not it is in a voice message acceptable state from the opponent party, that is, whether or not the above-described telephone packet signal including the responding message data has entirely been transmitted to the opponent party. When the flag Fh is "1", this means that it is in the voice message acceptable state from the opponent party. On the other hand, if the flag Fh is "0", this means that it is not in the voice message acceptable state.

In a case that "1" is set to the flag Fh in the step S79, that is, in a case that it is in the voice message acceptable state from the opponent party, the main CPU 16 proceeds to a step S81 to extract receiving speech data from the telephone packet signal transmitted from the opponent party, and stores the extracted receiving speech data in the flash memory 54. Then, in a step S83, "1" is set to the above-described flag Fc, and then, the process goes through the flowchart to repeat from the step Si. On the other hand, in a case that "1" is not set in the flag Fh, the main CPU 16 skips the steps S81 and S83 to go through the flowchart.

In a case that it is determined that the receiving speech data is not included in the telephone packet signal in the above-described step S77, the main CPU 16 proceeds to a step S85 to determine whether or not an end speech instruction is included in the telephone packet signal. Here, in a case that the end speech instruction is not included, the process directly goes through the flowchart. On the other hand, in a case that the end speech instruction is included, the end speech process in the step S87 is executed.

That is, the telephone packet signal including the end speech instruction is generated, and the generated telephone packet signal is input to the LAN controller 14. Consequently, the telephone packet signal including the end speech instruction is transmitted to the opponent party to end a communication performance with the opponent party.

After completion of the process in the step S87, the main CPU 16 proceeds to a step S89 to set "0" in each of the flags Fd, Fe, Fh and Fk. Here, the flag Fk is an index for indicating that it is in a communication state with the opponent party, and when the flag Fk is "1", this means that it is in a communication state with the opponent party. On the other hand, when the flag Fk is "0", this means that it is not in the communication state with the opponent party.

Then, the main CPU 16 instructs the sub CPU 48 to display the above-described call history message in FIG. 5 on the liquid crystal display 50 in a step S91, and instructs the sub CPU 48 to turn off the light-emitting diode 52 in a step S93. Then, the process goes through the flowchart to repeat from the step S1.

Figure 9:
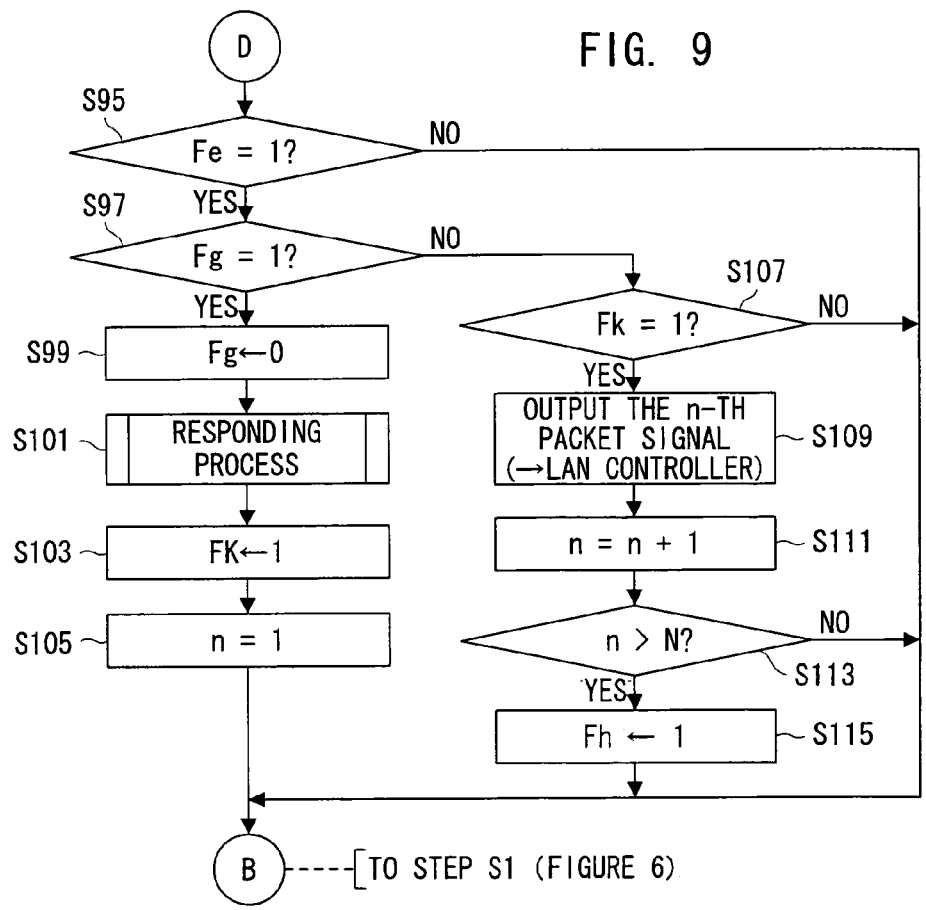
FIG. 9 is a flowchart continued from FIG. 6 via a different route from FIG. 7.

Returning to FIG. 6, when it is determined that the packet signal is not received in the step S11, the main CPU 16 proceeds to a step S95 in FIG. 9. In the step S95, it is determined whether or not "1" is set in the flag Fe. Here, in a case that "1" is set in the flag Fe, that is, the answering telephone function is turned on, the main CPU 16 proceeds to a step S97 to determine whether or not "1" is set in the flag Fg.

Here, in a case that "1" is set in the flag Fg, that is, in a case that an incoming is being received, the main CPU 16 proceeds to a step S99 to set "0" in the flag Fg. Then, a responding process in a step S101 is executed. The above-described telephone packet signal including the response instruction is generated, and the generated telephone packet signal is sent to the opponent party via the LAN controller 14.

After completion of the process in the step S101, the main CPU 16 sets "1" in the flag Fk in a step S103, "1" is set in the variable n in a step S105, and then, the process goes through the flowchart. It is noted that the variable n is an index for indicating the number of N telephone packet signals including the above-described responding message data.

The main CPU 16 proceeds to a step S107 to determine whether or not "1" is set in the flag Fk. Here, in a case that "1" is set in the flag Fk, that is, in a case that it is in under communication, the main CPU 16 proceeds to a step S109.

On the other hand, in a case that "1" is not set in the flag Fk, the process goes through the flowchart.

In the step S109, the main CPU 16 inputs to the LAN controller 14 the "n"-th telephone packet signal corresponding to the variable n out of N telephone packet signals including the responding message. Then, in a step S111, a value of the variable n is incremented by "1", and then, the process proceeds to a step S113 to determine whether or not the incremented value of the variable n exceeds a maximum value N. Here, in a case that the value of the variable n exceeds the maximum value N, the process goes through the flowchart to repeat from the step S1. On the other hand, in a case that the value of the variable n is equal to or less than the maximum value, "1" is set in the flag Fh in a step S115, and then, the process goes through the flowchart.

Again, returning to the step S1, when it is determined that the voice message eliminating operation is performed by an operation of the operation key 46 in the step S7, the main CPU 16 proceeds to a step S117 in FIG. 10. Then, in the step S117, it is determined whether or not "1" is set in the flag Fa. Here, in a case that "1" is set in the flag Fa, that is, in a case that the pay broadcast is being received now, the process goes through the flowchart to repeat from the step S1.

On the other hand, in a case that "1" is not set in the flag Fa, the main CPU 16 proceeds from the step S117 to a step S119 to determine whether or not "1" is set in the flag Fc. Here, in a case that "1" is set in the flag Fc, that is, in a case that a voice message is recorded by the answering telephone function, a voice message eliminating process in a step S121 is executed. That is, all the receiving speech data stored in the flash memory 54 are eliminated. Then, after completion of the process in the step S121, "0" is set in the flag Fc in a step S123, and the pseudo-sound generating circuit 42 is controlled to output a sound message indicating that all the voice messages are eliminated in a step S125.

Then, "0" is set in the flag Fb in a step S127, the sub CPU 48 is informed that a display of the liquid crystal display 50 is cleared in a step S129, and then, the process goes through the flowchart to return to the step S1. It is noted that in a case that "1" is not set in the flag Fb in the above-described step S119, the steps S121-S125 are skipped to proceed to the step S127.

When it is determined that a voice message reproducing operation is performed by the operation key 46 in the step S5 in FIG. 6, the main CPU 16 proceeds to a step S131 in FIG. 11. Then, it is determined whether or not "1" is set in the flag Fa in the step S131. Here, in a case that "1" is set in the flag Fa, the process goes through the flowchart to repeat from the step S1.

On the other hand, in a case that "1" is not set in the flag Fa, the main CPU 16 proceeds from the step S131 to a step S133 to determine whether or not "1" is set in the flag Fc. Here, in a case that "1" is set in the flag Fc, a voice message reproducing process in a step S135 is executed. That is, the receiving speech data stored in the flash memory 54 are sequentially read, and the read receiving speech data are sequentially recorded in the receiving speech data storing area 18b of the SDRAM 18. When a data amount of the receiving speech data stored in the receiving speech data storing area 18b reaches a second threshold value, the stored receiving speech data is transferred to the DSP 20 so as to be decoded. Consequently, a voice message is reproduced. After completion of the process in the step S135, the main CPU 16 goes through the flowchart.

In a case that "1" is not set in the flag Fc in the step S133, the main CPU 16 proceeds to a step S137 to control the pseudo-sound generating circuit 42 to output a sound message indicating that a voice message is not recorded. Then, after completion of the process in the step S137, the process returns to the step S1 in FIG. 6.

Figure 12:
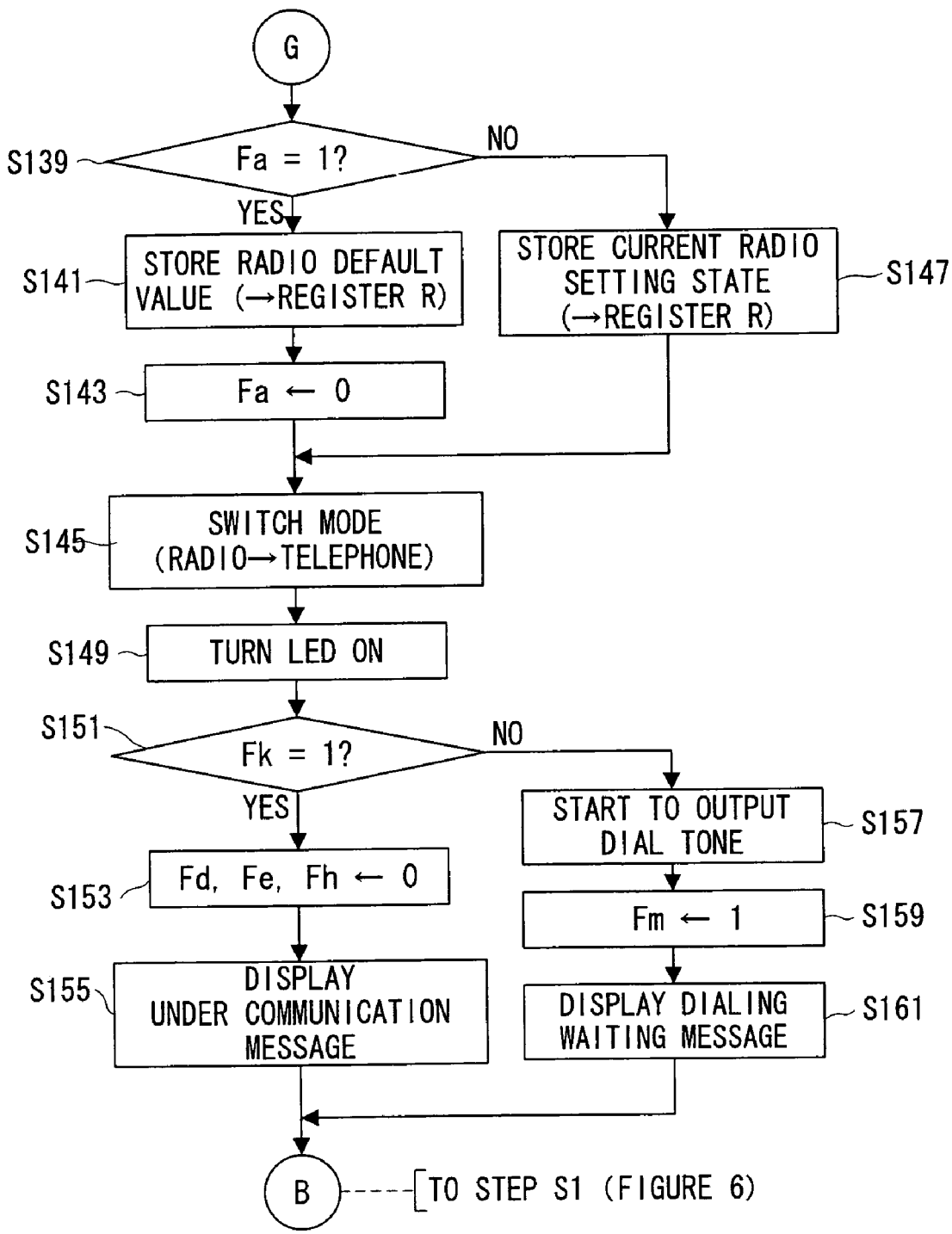
FIG. 12 is a flowchart continued from FIG. 6 via a different route from FIG. 11.

In the step S3 in FIG. 6, in a case that it is determined that the hook switch 40 is in the off-hook state, the main CPU 16 proceeds to a step S139 in FIG. 12. Then, it is determined whether or not "1" is set in the flag Fa in the step S139. Here, in a case that "1" is set in the flag Fa in the step S139, the process proceeds to a step S141 to store a default value when causing the contents reproducing apparatus 10 to function as an Internet radio receiver in the above-described register R. It is noted that the default value is previously prepared within the flash memory 62 as a program memory.

After completion of the process in the step S141, the main CPU 16 sets "0" in the flag Fa in a step S143. Then, the process proceeds to a step S145 to switch from the radio mode to the telephone mode. On the other hand, in a case that "1" is not set in the flag Fa in the above-described step S139, the process proceeds to a step S147 to store a current setting state as an Internet radio receiver in the register R. Then, after completion of the process in the step S141, the process proceeds to a step S145.

After switching to the telephone mode in the step S145, the main CPU 16 blinks the light-emitting diode 52 in a step S149. Then, it is determined whether or not "1" is set in the flag Fk in a step S151. Here, in a case that "1" is set in the flag Fk, that is, in a case of being under communication with the opponent party now, the process proceeds to a step S153 to set "1" in each of the flags Fd, Fe, and Fh. Then, the sub CPU 48 is informed that the above-described under communication message is to be displayed on the liquid crystal display 50 in a step S155, and then, the process goes through the flowchart.

On the other hand, in a case that "1" is not set in the flag Fk in the step S151, the main CPU 16 controls the pseudo-sound generating circuit 42 to start to output a dial tone. Then, "1" is set in a flag Fm in a step S159, the sub CPU 48 is informed that the above-described dialing waiting message is to be displayed on the liquid crystal display 50 in a step S161, and then, the process goes through the flowchart. It is noted that the flag Fm is an index for indicating whether or not the dial tone is in an output state by the pseudo-sound generating circuit 42, and when the flag Fm is "1", this means that the dial tone is output. When the flag Fm is "0", the dial tone is not output.

Figure 13:
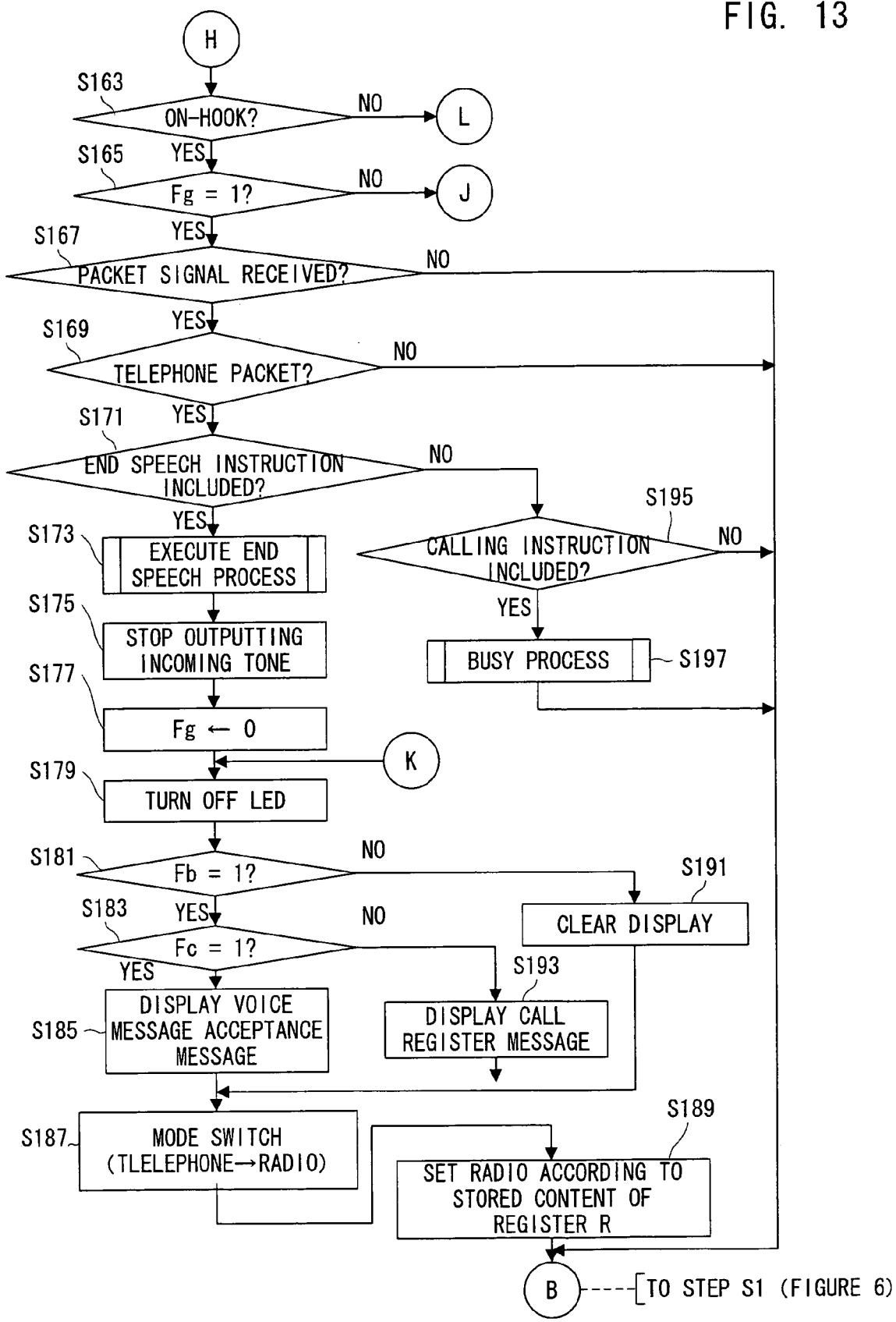
FIG. 13 is a flowchart continued from FIG. 6 via a different route from FIG. 12.

Returning to FIG. 6 once again, when the current mode is not the radio mode in the step Si, that is, when the current mode is the telephone mode, the main CPU 16 proceeds to a step S163 in FIG. 13. Then, in the step S163, it is determined whether or not the hook switch 40 is in the on-hook state.

When the hook switch 40 is in the on-hook state, the main CPU 16 determines whether or not the above-described flag Fg is "1" in a step S165. Then, when the flag Fg is "1", that is, when an incoming is arriving, it is determined whether or not any packet signal is received in a step S167. Here, in a case that a packet signal is not received, the process goes through the flowchart once to repeat from the step Si once again. On the other hand, when any packet signal is received, the process proceeds to a step S169 to determine whether or not the received packet signal is a telephone packet signal.

If it is determined the telephone packet signal is received in the step S169, the main CPU 16 determines whether or not an end speech instruction is included in the telephone packet signal in a step S171. Then, in a case that the end speech instruction is included, an end speech process similarly to that in the step S87 in FIG. 8 is executed in a step S173.

After completion of executing the end speech process in the step S173, the main CPU 16 controls the pseudo-sound generating circuit 42 so as to stop outputting the above-described incoming tone in a step S175. Then, after setting "0" in the flag Fg in a step S177, the CPU informs the sub CPU 48 of turning off the light-emitting diode 52 in a step S179. Furthermore, it is determined whether or not "1" is set in the flag Fb in a step S181.

Here, in a case that "1" is set in the flag Fb, that is, in a case that there is an incoming during receiving the pay broadcast, the main CPU 16 proceeds to a step S183 to further determine whether or not "1" is set in the flag Fc. In a case that "1" is set in the flag Fc, that is, in a case that a voice message is recorded by the answering telephone function, the sub CPU 48 is informed that the voice message acceptance message in FIG. 4 is to be displayed on the liquid crystal display 50 in a step S185. Then, in a step S187, the telephone mode is shifted to the radio mode. Furthermore, a receiving channel of the Internet radio broadcasting is set on the basis of the stored data in the above-described register R, its volume is also set in a step S189, and then, the process goes through the flowchart to return to the step Si in FIG. 6.

On the other hand, in a case that "1" is not set in the flag Fb in the above-described step S181, the main CPU 16 proceeds to a step S191 to inform the sub CPU 48 that the display on the liquid crystal display 50 is to be cleared. Then, after completion of the process in the step S183, the process proceeds to the step S187. Furthermore, in a case that "1" is not set in the flag Fc in the step S183, the process proceeds to a step S193. Then, the sub CPU 48 is informed that the call history message in FIG. 5 is to be displayed on the liquid crystal display 50 in the step S193, and then, the process proceeds to the step S187.

Furthermore, when the end speech instruction is not included in the received telephone packet signal in the step S171, the main CPU 16 proceeds to a step S195 to determine whether or not a calling instruction is included in the telephone packet signal. Here, in a case that the calling instruction is included, a busy process similarly to that in the step S49 in FIG. 7 is executed in the step S197, and then, the process goes through the flowchart to repeat from the step Si in FIG. 6. On the other hand, in a case that the calling instruction is not included in the step S195, the process goes through the flowchart as it is.

Figure 14:
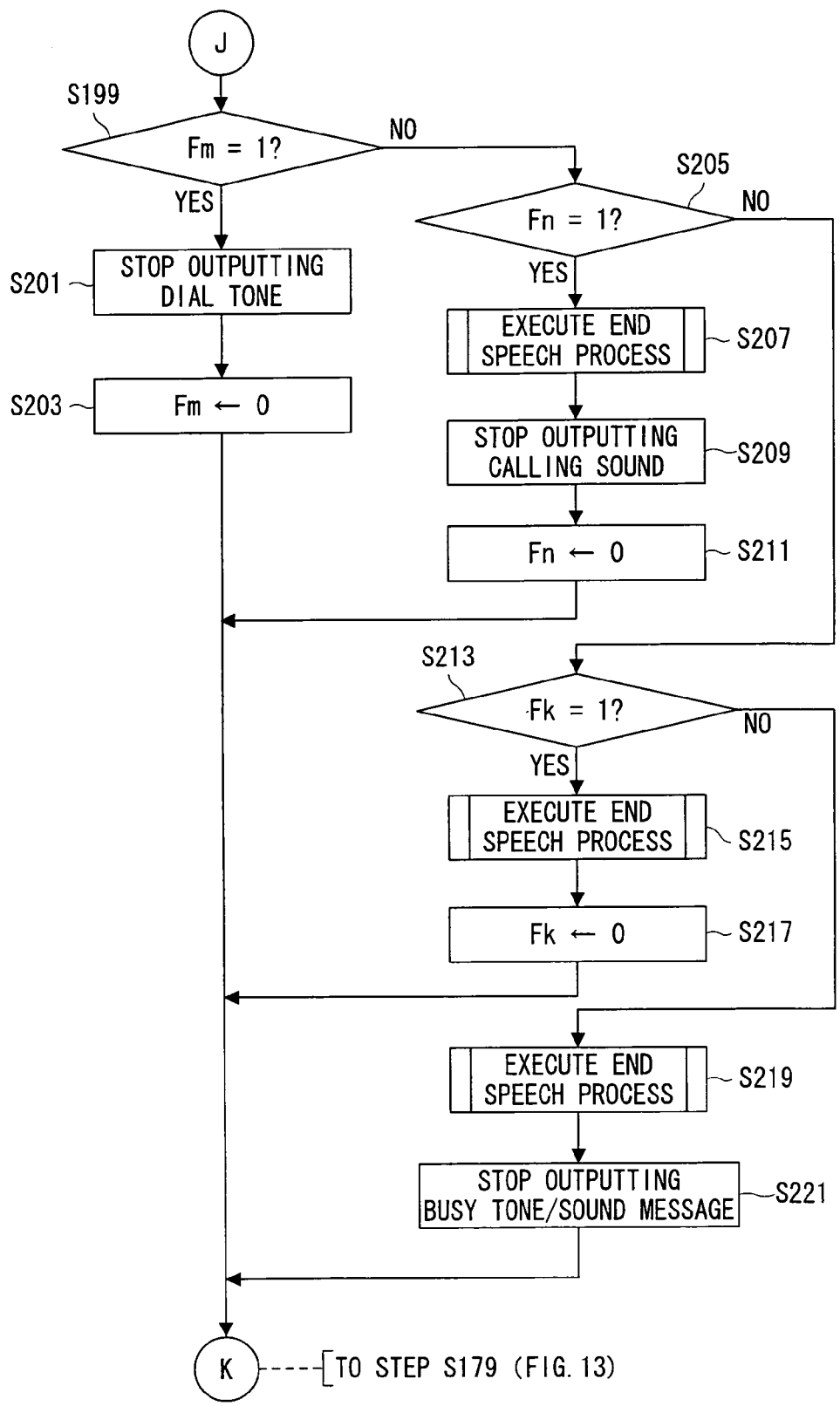
FIG. 14 is a flowchart continued from FIG. 13.

In a case that "1" is not set in the flag Fg in the above-described step S165, the main CPU 16 proceeds to a step S199 in FIG. 14. Then, it is determined whether or not "1" is set in the flag Fm in the step S199. Here, in a case that "1" is set in the flag Fm, that is, in a case that a dial tone is output by the pseudo-sound generating circuit 42, the process proceeds to a step S201 to control the pseudo-sound generating circuit 42 so as to stop outputting the dial tone. Then, "0" is set in the flag Fm in a step S203, and then, the process proceeds to the step S179 in FIG. 13.

On the other hand, in a case that "0" is set in the flag Fm in the step S199, the main CPU 16 proceeds to a step S205. Then, it is determined whether or not "1" is set in the flag Fn in the step S205. It is noted that the flag Fn is an index for indicating whether or not the opponent party is being called now, and when the flag Fn is "1", this means that the opponent party is being called. On the other hand, when the flag Fn is "0", this means that it is not in the calling state of the opponent party.

In a case that the flag Fn is "1" in the step S205, that is, in a case that the opponent party is being called, the main CPU 16 proceeds to a step S207 to perform an end speech process similarly to that in the step S87 in the above-described FIG. 8. In this case, since the above-described calling sound is in a state of output from the speaker 36a of the receiver 36, and the pseudo-sound generating circuit 42 is controlled so as to stop outputting the calling sound in a step S209. Then, "0" is set in the flag Fn in a step S211, and then, the process proceeds to the step S179 in FIG. 13.

Furthermore, in a case that flag Fn is "0" in the step S205, the main CPU 16 proceeds to a step S213 to determine whether or not "1" is set in the flag Fk. Here, in a case that the flag Fk is "1", that is, in a case that it is under communication with the opponent party, the process proceeds to a step S215 to execute an end speech process similarly to that in the above-described step S207. Then, "0" is set in the flag Fk in a step S217, and then, the process proceeds to the step S179 in FIG. 13.

On the other hand, in a case that the flag Fk is "0" in the step S213, the main CPU 16 executes an end speech process similarly to that in the step S207 in a step S219. Then, in this case, the above-described busy tone or sound message is in a state of output from the speaker 36a of the receiver 36, and therefore, the pseudo-sound generating circuit 42 is controlled so as to stop outputting the busy tone or sound message in a step S221, and then, the process proceeds to the step S179 in FIG. 13.

Figure 15:
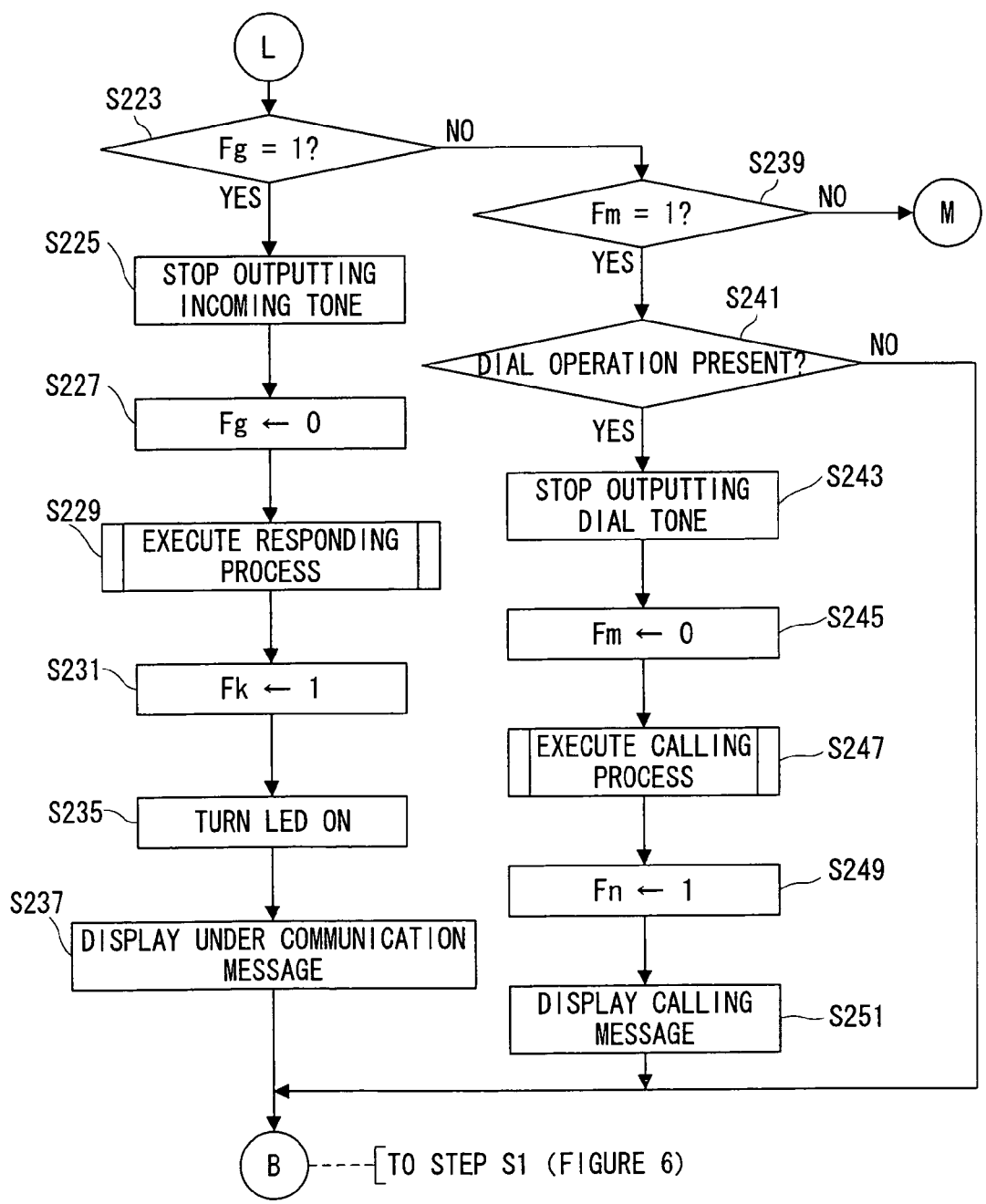
FIG. 15 flowchart continued from FIG. 13 via a different route from FIG. 14.

Furthermore, when the hook switch 40 is in an off-hook state in the step S163 in FIG. 13, the main CPU 16 proceeds to a step S223 in FIG. 15. Then, it is determined whether or not "1" is set in the flag Fg in the step S223.

Here, when "1" is set in the flag Fg, that is, when an incoming is arriving, the main CPU 16 controls the pseudo-sound generating circuit 42 so as to stop outputting the incoming tone in a step S225. Then, "0" is set in the flag Fg in a step S227, and then, responding process similarly to that in the step S101 in FIG. 9 is executed in a step S229. Furthermore, "1" is set in the flag Fk in a step S231, and the light-emitting diode 52 is illuminated in a step S235. Then, the sub CPU 48 is informed that the above-described under-communication message is to be displayed on the liquid crystal display 50 in a step S237, and then, the process goes through the flowchart.

On the other hand, in a case that the flag Fg is "0" in the step S223, the main CPU 16 proceeds to a step S239 to determine whether or not "1" is set in the flag Fm. Here, in a case that "1" is set in the flag Fm, that is, in a case that a dial tone is output from the speaker 36a of the receiver 36, the process proceeds to a step S241. Then, it is determined whether or not a dial operation is performed by an operation of the operation key 46 in the step S241.

When the dial operation is performed in the step S241, the main CPU 16 controls the pseudo-sound generating circuit 42 so as to stop outputting the dial tone in a step S243. Then, "0" is set in the flag Fm in a step S245, and a calling process is executed in a step S247. That is, a telephone packet signal including the above-described calling instruction is generated, and the generated telephone packet signal is input to the LAN controller 14. Then, "0" is set in the flag Fn in a step S249, and then, the process goes through the flowchart. It is noted that in a case that the dial operation is not performed in the step S241, the steps S243-S251 are skipped to go through the flowchart.

Figure 16:
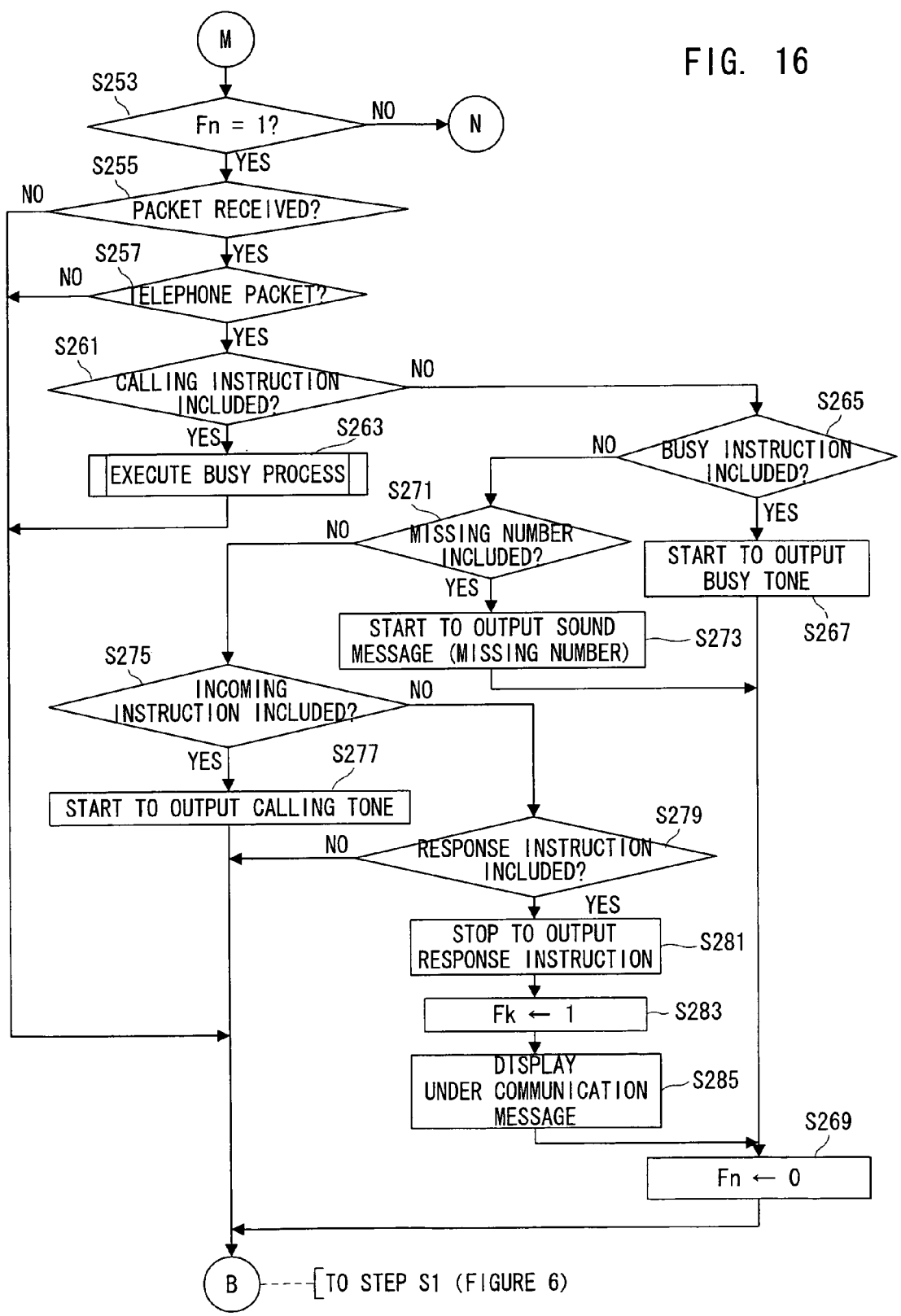
FIG. 16 is a flowchart continued from FIG. 15.

Furthermore, in a case that the flag Fm is "0" in the step S239, the main CPU 16 proceeds to a step S253 in FIG. 16. Then, it is determined whether or not "1" is set in the flag Fn in the step S253.

Here, in a case that "1" is set in the flag Fn, that is, in a case that the opponent party is being called, the process proceeds to a step S255 to determine whether or not any packet signal is received. Here, in case that a packet signal is not received, the process goes through the flowchart at a time. On the other hand, if any packet signal is received, the process proceeds to a step S257 to determine whether or not the received packet signal is a telephone packet signal.

When it is determined that the telephone packet signal is received, the main CPU 16 determines whether or not the above-described calling instruction is included in the telephone packet signal in a step S261. Then, in a case that the calling instruction is included, a busy process similarly to the step S49 in FIG. 7 is performed in a step S263, and then, the process goes through the flowchart.

In a case that the calling instruction is not included in the step S261, it is determined whether or not a busy instruction is included in a step S265. Here, in a case that the busy instruction is included, the pseudo-sound generating circuit 42 is controlled so as to output the busy tone 53 from the speaker 36a of the receiver 36 in a step S267, and then, "0" is set in the flag Fn in a step S269. Then, the process goes through the flowchart.

On the other hand, in a case that the busy instruction is not included in the received telephone packet signal, the main CPU 16 proceeds from the step S265 to a step S271. Then, it is determined whether or not the above-described missing number instruction is included in the telephone packet signal in the step S271. Here, in a case that the missing number instruction is included, the main CPU 16 controls the pseudo-sound generating circuit 42 so as to output a sound message indicative of a missing number from the speaker 36a of the receiver 36 in a step S273, and then, the process proceeds to the step S269. In a case that the missing number instruction is not included, the process proceeds to a step S275.

In the step S275, the main CPU 16 determines whether or not an incoming instruction is included in the received telephone packet signal. Here, in a case that the incoming instruction is included, the pseudo-sound generating circuit 42 is controlled so as to output the above-described calling tone from the speaker 36a of the receiver 36 in a step S277, and then, the process goes through the flowchart. On the other hand, in a case that the incoming instruction is not included, the process proceeds to a step S279 to determine whether or not a response instruction is included in the received telephone packet signal. Here, in a case that the response instruction is included, the pseudo-sound generating circuit 42 is controlled so as to stop outputting a calling tone in a step S281, and "1" is set in the flag Fk in a step S283. Then, in a step S285, the sub CPU 48 is informed that the above-described under-communication message is to be displayed on the liquid crystal display 50, and then, the process proceeds to the step S269. In a case that the response instruction is not included in the received telephone packet signal in the step S279, the process goes through the flowchart.

Figure 17:
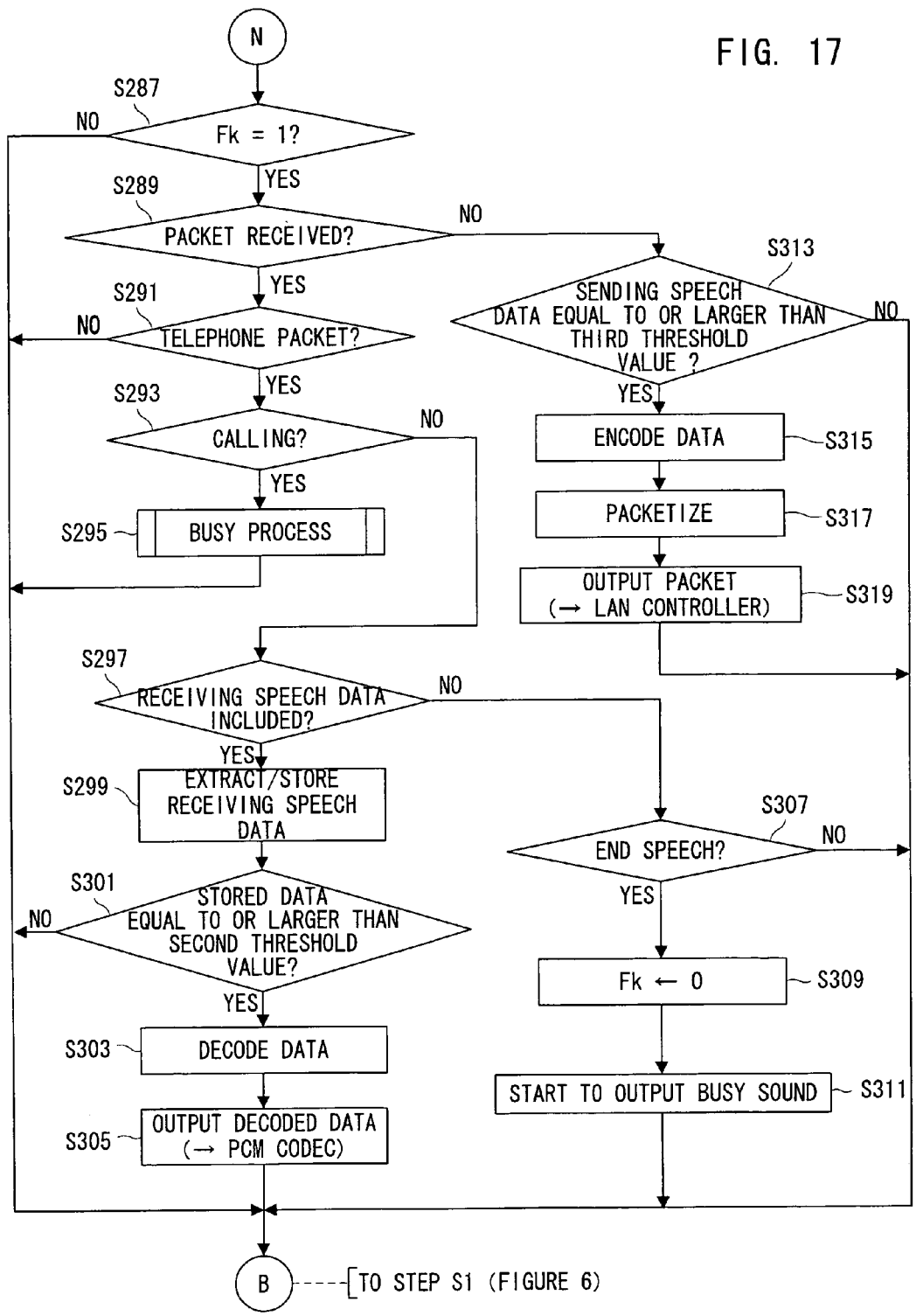
FIG. 17 is a flowchart continued from FIG. 16.

Furthermore, in a case that the flag Fn is not "1" in the above-described step S253, the main CPU 16 proceeds to a step S287 in FIG. 17. Then, it is determined whether or not "1" is set in the flag Fk in the step S287.

Here, in a case that "1" is set in the flag Fk, that is, in a case that it is under communication with the opponent party, the main CPU 16 determines whether or not any packet signal is received in a step S289. Then, in a case that a packet signal is received, the process proceeds to a step S291 to determine whether or not the received packet signal is the telephone packet signal.

When it is determined that the telephone packet signal is received, the main CPU 16 further determines whether or not a calling instruction is included in the telephone packet signal in a step S293. Here, in a case that the calling instruction is included, a busy process similarly to the step S49 in FIG. 7 is performed in a step S295, and then, the process goes through the flowchart.

In a case that the calling instruction is not included in the step S293, it is determined whether or not the above-described receiving speech data is included in the telephone packet signal in a step S297. Then, in a case that that the receiving speech data is included, the receiving speech data is extracted from the telephone packet signal, and the extracted receiving speech data is stored in the receiving speech data storing area 18b of the SDRAM 18 in a step S299. Then, it is determined whether or not a data amount of the receiving speech data stored in the receiving speech data storing area 18b reaches the second threshold value in a step S301.

Here, when it is determined that the data amount of the receiving speech data stored in the receiving speech data storing area 18b reaches the second threshold value, the main CPU 16 proceeds to a step S303 to transfer the receiving speech data stored in the receiving speech data storing area 18b to the DSP 20 so as to be decoded. Then, PCM data reproduced by the decoding is output to the PCM codec 32 in a step S305. Consequently, a receiving speech sound is output from the speaker 36a of the receiver 36.

It is noted that in a case that it is determined that "0" is set in the flag Fc in the step S287, the process directly goes through the flowchart to repeat from the step S1. Furthermore, in a case that it is determined that the received packet signal is not the telephone packet signal in the step S291, or in a case that it is determined that the data amount of the receiving speech data stored in the receiving speech data storing area 18b does not reach the second threshold value in the step S301 also, the process directly goes through the flowchart.

Furthermore, in a case that it is determined that the receiving speech data is not included in the step S297, the main CPU 16 proceeds to a step S307. Then, it is determined whether or not an end speech instruction is included in the received telephone packet signal. Here, in a case that the end speech instruction is included, "0" is set in the flag Fk in a step S309, the pseudo-sound generating circuit 42 is controlled so as to output a busy tone from the speaker 36a of the receiver 36 in a step S311, and then, the process goes through the flowchart. On the other hand, in a case that the end speech instruction is not included, the steps S309 and S311 are skipped to directly go through the flowchart.

Then, in a case that that any packet signal is not received in the above-described step S289, the process proceeds to a step S313. Then, it is determined that whether or not sending speech data stored in the sending speech data storing area 18c of the SDRAM 18 is equal to or more than the third threshold value in the step S313. Here, when an amount of the stored sending speech data is equal to or more than the third threshold value, the sending speech data is transferred to the DSP 20 so as to be encoded in a step S315. Then, a packet signal is formed on the basis of the encoded sending speech data in a step S317, and the formed packet signal is output to the LAN controller 14 in a step S319. Thus, the packet signal including the sending speech data is transmitted to the opponent party. It is noted that in a case that the amount of the sending speech data stored in the sending speech data storing area 18c is less than the third threshold value in the step S313, the process directly goes through the flowchart to repeat from the step S1.

As can be understood from the above description, the contents reproducing apparatus 10 of this embodiment functions as the Internet radio receiver, and, even if there is a telephone call from the outside during receiving a pay broadcast, does not switch to the function as an IP telephone, and also does not output an incoming tone. Accordingly, since the reception of the pay broadcast is continued, it is possible to economically receive the pay broadcast with no waste of money.

Furthermore, when there is a telephone call during receiving the pay broadcast, a message indicative so is displayed on the liquid crystal display, and the light-emitting diode 52 blinks, and therefore it is possible for an operator to easily confirm that there is the telephone call. In addition, if the answering telephone function is turned on, a voice message from the opponent party can be recorded.

It is noted that although a description is made on where the function as an IP telephone is added to the Internet radio receiver in this embodiment, the function as the IP telephone may be added to an apparatus except for the Internet radio receiver. For example, the function as an IP telephone may be added to an apparatus receiving image information such as a TV program, and so on over the Internet.

Furthermore, connections to the Internet may be by a wired or wireless manner. In addition, this invention is also applicable to an apparatus capable of delivering the contents and making a communication over a network except for the Internet.

Then, although the sub CPU 48 is provided in addition to the main CPU 16, a processing (man-machine interface processing) by the sub CPU 48 may also be executed by the main CPU 16 without providing the sub CPU 48. Furthermore, the main CPU 16 and the DSP 20 are integrally constructed by the ASIC with-each other, or these may be separately provided.

In addition, the receiver 36 may be connected to the main body of the contents reproducing apparatus 10 in a wireless manner, and a so-called child device may be provided in addition to the receiver. Furthermore, a key dedicated to the dial operation may be provided in addition to the operation key 46.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contents reproducing apparatus having a contents receiving function and a telephone function, comprising:
    a call detecting means for detecting reception of a calling instruction of a telephone;
    a first determining means for determining whether or not a pay content is being received now when said call detecting means detects the reception of said calling instruction;
    a mode switching means for switching to a telephone mode when it is determined that said pay content is not being received by said first determining means; and
    a disabling means for disabling a mode switch by said mode switching means when it is determined that said pay content is being received by said first determining means;
    wherein said pay content receiving function is an Internet radio receiving function, and said telephone function is an IP telephone function.

2. The contents reproducing apparatus according to claim 1, wherein said disabling means includes a busy processing means to execute a busy process for informing an opponent party of being under communication when it is determined that said pay content is being received by said first determining means.

3. The contents reproducing apparatus according to claim 1, further comprising a reproducing means for reproducing in a real time manner the pay content being received.

4. The contents reproducing apparatus according to claim 1, wherein said disabling means includes a second determining means for determining whether or not an answering telephone function is set when it is determined that said pay content is being received by said first determining means, and a answering telephone processing means for executing an answering telephone process when it is determined that said answering telephone function is set by said second determining means.

5. The contents reproducing apparatus according to claim 4, wherein said answering telephone processing means includes a returning means for returning a record guide message to the opponent party, and a recording means for recording a sending speech of said opponent party in response to said record guide message.

6. The contents reproducing apparatus according to claim 5, wherein said disabling means includes an uncommunicable means for executing an uncommunicable process to inform the opponent party of being in an uncommunicable state when it is determined that said answering telephone function is not set by said second determining means.

7. The contents reproducing apparatus according to claim 1, wherein the pay content comprises a pay program of a charging system of charging depending on the number of musics of received music content or a receiving time period of the pay program.

* * * * *